(12) United States Patent
Clark et al.

(10) Patent No.: US 9,699,974 B2
(45) Date of Patent: *Jul. 11, 2017

(54) ROTOR-TYPE SPRINKLER WITH PRESSURE REGULATOR IN OUTER CASE

(71) Applicant: Hunter Industries, Inc., San Marcos, CA (US)

(72) Inventors: Michael L. Clark, San Marcos, CA (US); Zachary B. Simmons, Escondido, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,331

(22) Filed: Jan. 27, 2016

(65) Prior Publication Data
US 2016/0136662 A1    May 19, 2016

Related U.S. Application Data

(63) Continuation-in-part of application No. 14/171,464, filed on Feb. 3, 2014, now Pat. No. 9,296,004.

(51) Int. Cl.
*A01G 25/00* (2006.01)
*B05B 15/10* (2006.01)
*B05B 3/04* (2006.01)

(52) U.S. Cl.
CPC ............ *A01G 25/00* (2013.01); *B05B 3/0431* (2013.01); *B05B 15/10* (2013.01)

(58) Field of Classification Search
CPC  B05B 1/30; B05B 1/3006; B05B 3/04; B05B 3/0409; B05B 3/0418; B05B 3/0422; B05B 3/045; B05B 15/10; B05B 3/0431; A01G 25/00

USPC ........ 239/203–206, 541, 570–572, 574, 579, 239/583
See application file for complete search history.

(56) References Cited

U.S. PATENT DOCUMENTS

| | | |
|---|---|---|
| 3,948,285 A * | 4/1976 | Flynn .................... B05B 1/3006 137/494 |
| 5,058,806 A | 10/1991 | Rupar |
| 5,288,022 A | 2/1994 | Sesser |
| 5,375,768 A | 12/1994 | Clark |
| 5,423,486 A | 6/1995 | Hunter |
| 5,456,411 A | 10/1995 | Scott et al. |
| 5,556,036 A | 9/1996 | Chase |
| 5,699,962 A | 12/1997 | Scott et al. |
| 5,711,486 A | 1/1998 | Clark et al. |
| 5,720,435 A | 2/1998 | Hunter |
| 5,762,270 A | 6/1998 | Kearby et al. |
| 5,918,812 A | 7/1999 | Beutler |
| 5,927,607 A | 7/1999 | Scott |

(Continued)

*Primary Examiner* — Christopher Kim
(74) *Attorney, Agent, or Firm* — Knobbe Martens Olson & Bear, LLP

(57) ABSTRACT

An irrigation sprinkler can include an outer case and a riser extendible from the outer case by water pressure. A nozzle can be rotatably mounted at an upper end of the riser. A water inlet can connect the sprinkler to a water source. A turbine may be mounted in the riser for rotation by water entering a lower end of the riser. A gear train reduction can be mounted in the riser. A gear driven coupling mechanism mounted in the riser may couple the gear train reduction and the nozzle. A pressure regulator can be mounted inside the outer case at the water inlet.

22 Claims, 25 Drawing Sheets

(56) References Cited

U.S. PATENT DOCUMENTS

| | | |
|---|---|---|
| 5,988,523 A | 11/1999 | Scott |
| 6,042,021 A | 3/2000 | Clark |
| 6,050,502 A | 4/2000 | Clark |
| 6,082,632 A | 7/2000 | Clark et al. |
| 6,138,924 A | 10/2000 | Hunter et al. |
| 6,227,455 B1 | 5/2001 | Scott et al. |
| 6,241,158 B1 | 6/2001 | Clark et al. |
| 6,244,521 B1 | 6/2001 | Sesser |
| 6,299,075 B1 | 10/2001 | Koller |
| 6,457,656 B1 | 10/2002 | Scott |
| 6,491,235 B1 | 12/2002 | Scott et al. |
| 6,499,672 B1 | 12/2002 | Sesser |
| 6,651,905 B2 | 11/2003 | Sesser et al. |
| 6,688,539 B2 | 2/2004 | Vander Griend |
| 6,695,223 B2 | 2/2004 | Beutler et al. |
| 6,736,332 B2 | 5/2004 | Sesser et al. |
| 6,817,543 B2 | 11/2004 | Clark |
| 6,840,460 B2 | 1/2005 | Clark |
| 6,848,632 B2 | 2/2005 | Clark |
| 6,854,664 B2 | 2/2005 | Smith |
| 6,871,795 B2 | 3/2005 | Anuskiewicz |
| 6,957,782 B2 | 10/2005 | Clark et al. |
| 7,032,836 B2 | 4/2006 | Sesser et al. |
| 7,040,553 B2 | 5/2006 | Clark |
| 7,159,795 B2 | 1/2007 | Sesser et al. |
| 7,240,860 B2 | 7/2007 | Griend |
| 7,287,711 B2 | 10/2007 | Crooks |
| 7,303,147 B1 | 12/2007 | Danner et al. |
| 7,322,533 B2 | 1/2008 | Grizzle |
| D593,182 S | 5/2009 | Anuskiewicz |
| 7,530,504 B1 | 5/2009 | Danner et al. |
| 7,611,077 B2 | 11/2009 | Sesser et al. |
| 7,621,467 B1 | 11/2009 | Garcia |
| 7,677,469 B1 | 3/2010 | Clark |
| 7,681,807 B2 | 3/2010 | Gregory |
| 7,748,646 B2 | 7/2010 | Clark |
| 7,828,230 B1 | 11/2010 | Anuskiewicz et al. |
| 7,861,948 B1 | 1/2011 | Crooks |
| 8,056,829 B2 | 11/2011 | Gregory |
| 8,220,723 B2 | 7/2012 | Clark |
| 8,272,578 B1 | 9/2012 | Clark et al. |
| 8,282,022 B2 | 10/2012 | Porter |
| 8,297,533 B2 | 10/2012 | Dunn et al. |
| 8,313,043 B1 | 11/2012 | Crooks et al. |
| 8,408,482 B2 | 4/2013 | Gregory |
| 8,413,681 B2 | 4/2013 | Schmuckle |
| 8,430,376 B1 | 4/2013 | Danner et al. |
| 8,469,288 B1 | 6/2013 | Clark et al. |
| 8,474,733 B1 | 7/2013 | Clark et al. |
| 8,556,193 B2 | 10/2013 | Anuskiewicz |
| 8,602,325 B2 | 12/2013 | Clark et al. |
| 8,622,317 B1 | 1/2014 | Anuskiewicz |
| 8,622,318 B1 | 1/2014 | Clark et al. |
| 8,636,229 B1 | 1/2014 | Clark et al. |
| 8,636,230 B1 | 1/2014 | Clark et al. |
| 8,636,233 B2 | 1/2014 | Clark et al. |
| 8,998,107 B2 * | 4/2015 | Sesser ................ B05B 1/3006 239/200 |
| 9,296,004 B1 * | 3/2016 | Clark ...................... B05B 15/10 |
| 2002/0162901 A1 | 11/2002 | Hunter et al. |
| 2005/0133619 A1 | 6/2005 | Clark |
| 2012/0024982 A1 | 2/2012 | Dunn et al. |
| 2012/0043398 A1 | 2/2012 | Clark |
| 2012/0132727 A1 | 5/2012 | Dunn et al. |
| 2012/0273593 A1 | 11/2012 | Clark |
| 2013/0074400 A1 | 3/2013 | Roess et al. |
| 2013/0075490 A1 | 3/2013 | Roess et al. |
| 2013/0270361 A1 | 10/2013 | Clark |

* cited by examiner

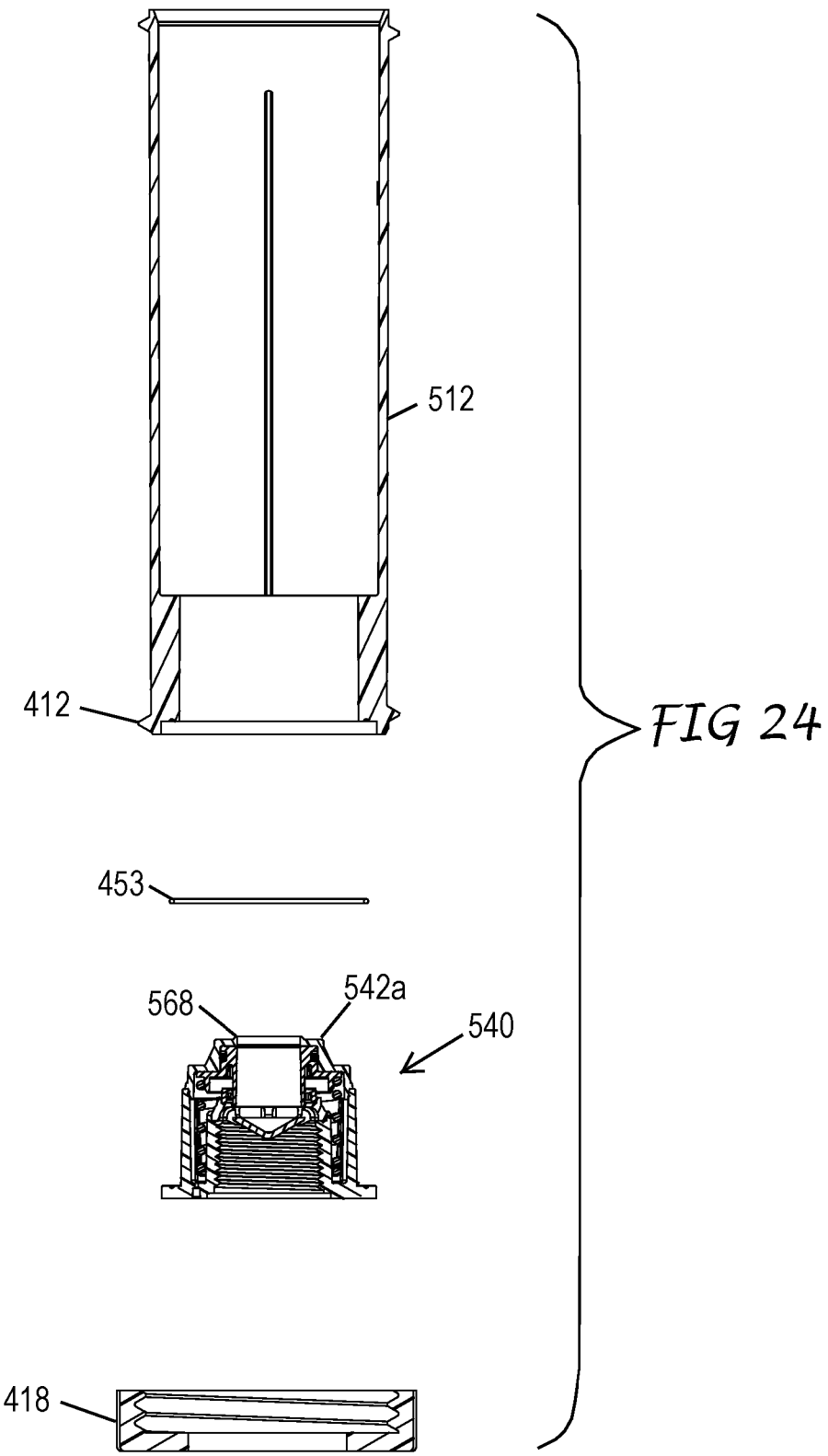

ROTOR-TYPE SPRINKLER WITH PRESSURE REGULATOR IN OUTER CASE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

The present disclosure relates to sprinklers used in residential and commercial irrigation for watering turf and landscaping.

Description of the Related Art

Many parts of the world lack sufficient rainfall at different times of the year to maintain the health of turf and landscaping. Irrigation systems are therefore used to deliver water to such vegetation from municipal water supplies and wells according to a watering schedule. Some typical irrigation systems comprise a programmable controller that turns valves ON and OFF to deliver water through a plurality of sprinklers connected to the valves via subterranean pipes. These sprinklers are sometimes rotor-type, impact, spray or rotary-stream sprinklers. Pressure regulators have been installed in residential and commercial irrigation systems externally of the sprinklers. U.S. Pat. No. 5,257,646 of Meyer discloses an in-line pressure regulator for an irrigation system. Pressure regulators have also been incorporated into the sprinklers themselves. U.S. Pat. No. 5,779,148 of Saarem et al. discloses a spray sprinkler with a pressure regulator in its extendible riser. Published U.S. Patent Application No. 2007/0007364 of Gregory discloses a rotor-type sprinkler with a pressure regulator located at the lower end of the riser below the turbine.

SUMMARY

In accordance with the present disclosure, an irrigation sprinkler can include an outer case and a riser extendible from the outer case by water pressure from a retracted position. A water inlet can be formed in the outer case for attachment to a water source. A nozzle can be mounted at an upper end of the riser. A pressure regulator may be mounted within the outer case between the water inlet and the riser.

In some embodiments, the nozzle is rotatably mounted at the upper end of the riser. A turbine can be mounted in the riser for rotation by water entering a lower end of the riser. In some embodiments, a gear train reduction is mounted in the riser. A gear driven coupling mechanism can be mounted in the riser and can couple the gear train reduction and the nozzle. In some embodiments, an irrigation sprinkler can include an outer case having a case volume. The outer case can have case inlet that can be coupled to a water supply. In some cases, the irrigation sprinkler includes a riser positioned at least partially within the case volume. The riser can have a riser inlet end having a riser inlet and a riser outlet end. In some embodiments, the riser includes an outlet housing. The outlet housing can be rotatably connected to the riser outlet end. In some embodiments, the riser includes a riser outlet in the outlet housing. The riser can include a turbine mounted in the riser and rotatable by water entering the riser inlet. In some cases, a gear train reduction is mounted in the riser and operably coupled with the turbine and with the outlet housing. The irrigation sprinkler can include a pressure regulator. The pressure regulator can be fixedly mounted to the case inlet within the outer case. In some embodiments, the pressure regulator is configured to regulate fluid pressure within the irrigation sprinkler as water enters the outer case to maintain a substantially constant pressure between the case inlet and the riser inlet.

In some embodiments, at least a portion of the pressure regulator surrounds at least a portion of the case inlet between the case inlet and an outer wall of the outer case. In some cases, the pressure regulator comprises a valve body and a regulator housing, the valve body configured to translate within the regulator housing in response to a fluid pressure within the outer case. The irrigation sprinkler can include a spring, wherein the spring biases the valve body to an opened position. In some embodiments, the outer case has a longitudinal axis and at least a portion of the spring overlaps at least a portion of the case inlet in a direction parallel to the longitudinal axis of the outer case, and at least a portion of the spring is positioned radially outward from the case inlet with respect to the longitudinal axis of the outer case. In some cases, the pressure regulator defines a regulator volume that is vented to atmosphere via a vent port, the regulator volume fluidly isolated from the case volume. In some embodiments, a filter is positioned within the vent port. The irrigation sprinkler can include a check valve positioned between the pressure regulator and the riser inlet. In some embodiments, the pressure regulator comprises a riser seat. The riser seat can be fixedly connected to the outer case. In some embodiments, the riser seat is moveable with respect to the outer case. In some cases, the riser seat decelerates the riser as the riser is transitioned from the extended position to the retracted position.

According to some variants, an irrigation sprinkler can include an outer case having a case inlet. The irrigation sprinkler can include a riser positioned at least partially within the outer case. The riser can be extendible from the outer case. In some embodiments, the riser is configured to transition between an extended position and a retracted position. The riser can have a riser inlet. In some embodiments, the riser has an outlet housing. The outlet housing can be rotatable with respect to the riser inlet. The riser can have a riser outlet in the outlet housing. In some embodiments, the riser includes a turbine mounted in the riser and rotatable by water entering the riser inlet. The turbine can be operably connected to the outlet housing. In some cases, the irrigation sprinkler includes a pressure regulator. The pressure regulator can be fixedly mounted to the outer case. In some embodiments, the pressure regulator is configured to regulate pressure within the irrigation sprinkler to maintain a substantially constant pressure of fluid entering the outer case.

In some embodiments, the irrigation sprinkler can include a check valve positioned between the pressure regulator and the riser inlet. In some case, the pressure regulator comprises a riser seat. In some embodiments, the riser seat is fixedly connected to the outer case. The riser can be moveable with respect to the outer case. In some embodiments, the riser seat decelerates the riser as the riser is transitioned from the extended position to the retracted position.

According to some variants, an irrigation sprinkler can include an outer case. The outer case can have a case inlet that can be coupled to a water supply to allow a flow of water into the irrigation sprinkler. In some embodiments, the irrigation sprinkler includes a riser. The riser can be positioned concentric with the outer case. In some embodiments, the irrigation sprinkler is positioned at least partially within the outer case. The riser can have a riser inlet and a riser outlet end. In some embodiments, the riser has a nozzle turret. The nozzle turret can be connected to the riser outlet end. In some embodiments, the riser has a nozzle in the nozzle turret. In some embodiments, the irrigation sprinkler includes a pressure regulator. The pressure regulator can be positioned at the case inlet within the outer case. In some embodiments, the pressure regulator is configured to regulate pressure of water entering the case inlet to maintain a substantially constant pressure of water entering the outer case. The pressure regulator can include a valve seat within the case inlet. In some cases, the pressure regulator includes a valve body positioned within the outer case and moveable with respect to the valve seat in response to pressure changes within the outer case. In some embodiments, movement of the valve body toward the valve seat reduces the flow of water into the case inlet and movement of the valve body away from the valve seat increases the flow of water into the case inlet.

n some embodiments, the nozzle turret can be rotatably connected to the riser outlet end. The riser can include a turbine mounted in the riser and rotatable by water entering the riser inlet. In some cases, the riser includes a gear train reduction mounted in the riser and operably coupled with the turbine and with the outlet housing.

n some cases, the pressure regulator includes a riser seat. The riser seat can be fixedly connected to the outer case. In some embodiments, the riser seat is moveable with respect to the outer case. In some cases, the riser seat decelerates the riser as the riser is transitioned from an extended position to a retracted position.

A method of manufacturing an irrigation sprinkler can include providing an outer case having a case volume and having an case inlet. In some embodiments, the method includes positioning a riser at least partially within the case volume. The riser can have a riser inlet end having a riser inlet and a riser outlet end. In some cases, the method includes connecting an outlet housing to the riser outlet end. The outlet housing can be rotatable with respect to the riser inlet and having a riser outlet. The method can include mounting a turbine in the riser, the turbine being rotatable by water entering the riser inlet. In some embodiments, the method includes mounting a gear train reduction in the riser. The method can include coupling the gear train reduction with the turbine and with the outlet housing. In some cases, the method includes fixedly mounting a pressure regulator within the outer case between the case inlet and the riser inlet. The pressure regulator can be configured to maintain a substantially constant pressure at the riser inlet.

In some embodiments, the method includes coupling the case inlet to a water supply. In some cases, the method includes extending the riser from the outer case. The method can include rotating the outlet housing with respect to the outer case. In some embodiments, the method includes supplying water to the irrigation sprinkler via the case inlet.

According to some variants, an irrigation sprinkler can include an outer case. The outer case can have a case volume and a first opening on a first end and a second opening on a second end. The sprinkler can include a riser. The riser can be positioned at least partially within the case volume. In some embodiments, the riser is configured to extend through the second case opening. The riser can have a riser inlet end having a riser inlet and a riser outlet end. In some embodiments, the riser includes an outlet housing connected to the riser outlet end. The riser can include a riser outlet in the outlet housing. In some embodiments, the sprinkler includes a pressure regulator. The pressure regulator can have an inlet. In some embodiments, the inlet can be coupled to a water supply. The pressure regulator can be mounted to the first open end. In some embodiments, the pressure regulator is positioned at least partially within the outer case. The pressure regulator can be configured to regulate fluid pressure within the irrigation sprinkler as water enters the outer case to maintain a substantially constant pressure inside the outer case and the riser inlet.

In some embodiments, the outlet housing is rotatably connected to the riser outlet end.

In some embodiments, the sprinkler further comprises a turbine mounted in the riser and rotatable by water entering the riser inlet and a gear train reduction mounted in the riser and operably coupled with the turbine and with the outlet housing;

In some embodiments, at least a portion of the pressure regulator surrounds at least a portion of the inlet of the pressure regulator between the inlet of the pressure regulator and an outer wall of the outer case.

In some embodiments, the pressure regulator comprises a valve body and a regulator housing, the valve body configured to translate within the regulator housing in response to a fluid pressure within the outer case.

In some embodiments, the pressure regulator comprises a spring, wherein the spring biases the valve body to an opened position.

In some embodiments, the outer case has a longitudinal axis and at least a portion of the spring overlaps at least a portion of the inlet of the pressure regulator in a direction parallel to the longitudinal axis of the outer case. In some embodiments, at least a portion of the spring is positioned radially outward from the inlet of the pressure regulator with respect to the longitudinal axis of the outer case.

In some embodiments, the pressure regulator defines a regulator volume that is vented to atmosphere via a vent port, the regulator volume fluidly isolated from the case volume.

In some embodiments, a filter is positioned within the vent port.

In some embodiments, the sprinkler includes a check valve positioned between (e.g., in a fluid path between) the pressure regulator and the riser inlet.

In some embodiments, the pressure regulator comprises a riser seat.

In some embodiments, the riser seat is fixedly connected to the outer case.

In some embodiments, the riser seat is moveable with respect to the outer case.

In some embodiments, the riser seat decelerates the riser as the riser is transitioned from an extended position to a retracted position.

According to some variants, an irrigation sprinkler includes an outer case with a first opening at a first end. In some embodiments, the sprinkler includes a pressure regulator. The pressure regulator can be attached to the first end and/or can be contained at least partially within the outer case. In some embodiments, the sprinkler includes a regulator inlet connected to the pressure regulator. The regulator inlet can be coupled to a water supply to allow a flow of water into the irrigation sprinkler. In some embodiments, the sprinkler includes a riser positioned concentric with and at least partially within the outer case and extendable through a second opening at a second end of the case. The riser can include a riser inlet end having a riser inlet and a riser outlet end. In some embodiments, the riser includes a nozzle turret connected to the riser outlet end. The riser can include a nozzle in the nozzle turret. In some embodiments, the sprinkler includes the pressure regulator. The pressure regulator can be configured to regulate pressure of water entering the regulator inlet to maintain a substantially constant pressure of water entering the outer case. In some embodiments, the pressure regulator includes a regulator housing. The pressure regulator can include a valve seat within the regulator inlet. In some embodiments, the pressure regulator includes a valve body positioned at least partially within the regulator housing. The valve body can be moveable with respect to the valve seat in response to pressure changes within the outer case. In some embodiments, movement of the valve body toward the valve seat reduces the flow of water into the case inlet. In some embodiments, movement of the valve body away from the valve seat increases the flow of water into the case inlet.

In some embodiments, the nozzle turret is rotatably connected to the riser outlet end.

In some embodiments, the riser further has a turbine mounted in the riser and rotatable by water entering the riser inlet and a gear train reduction mounted in the riser and operably coupled with the turbine and with the outlet housing.

In some embodiments, the pressure regulator comprises a riser seat.

In some embodiments, the riser seat is fixedly connected to the outer case.

In some embodiments, the riser seat is moveable with respect to the outer case

In some embodiments, the riser seat decelerates the riser as the riser is transitioned from an extended position to a retracted position.

According to some variants, an irrigation sprinkler can include an outer case. The outer case can have a case volume and a first open end and a second open end. In some embodiments, the sprinkler includes a pressure regulator. The pressure regulator can be located at least partially within the case volume. In some embodiments, the pressure regulator is positioned at least partially between the first open end and the second open end of the outer case. The sprinkler can include a regulator inlet. The regulator inlet can be connected to the pressure regulator. In some embodiments, the regulator inlet can be coupled to a water supply. In some embodiments, the sprinkler includes a riser positioned at least partially within the case volume. The riser can have a riser inlet end having a riser inlet. In some embodiments, the riser includes a nozzle positioned downstream of the riser inlet and configured to distribute water over an irrigated area. In some embodiments, the pressure regulator is configured to regulate fluid pressure within the irrigation sprinkler as water enters the outer case to maintain a substantially constant pressure in the case and the riser inlet when a higher water pressure is applied to the regulator inlet.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

FIG. 24 is an exploded view of the outer case assembly of FIG. 23.

DETAILED DESCRIPTION

Irrigation sprinklers can be used to distribute water to turf and other landscaping. Types of irrigations sprinklers include pop-up, rotor-type, impact, spray and/or rotary-stream sprinklers. In some applications, an irrigation system 2 can include multiple irrigation sprinklers 1 used to water a targeted area. One or more controllers (e.g., wireless and/or wired controllers) can be used to control the operation of multiple irrigation sprinklers. For example, one or more controllers can control when each of the sprinklers of the irrigation system transitions between an irrigating (e.g., ON) configuration and a non-irrigating (e.g., OFF) configuration. In some embodiments, the one or more controllers control the amount of water distributed by the sprinklers. The water source 9 for the irrigation system can be provided by a single water source, such as a well, a body of water, or water utility system. In some applications, multiple water sources are used.

Sprinkler Overview

Figure 1:
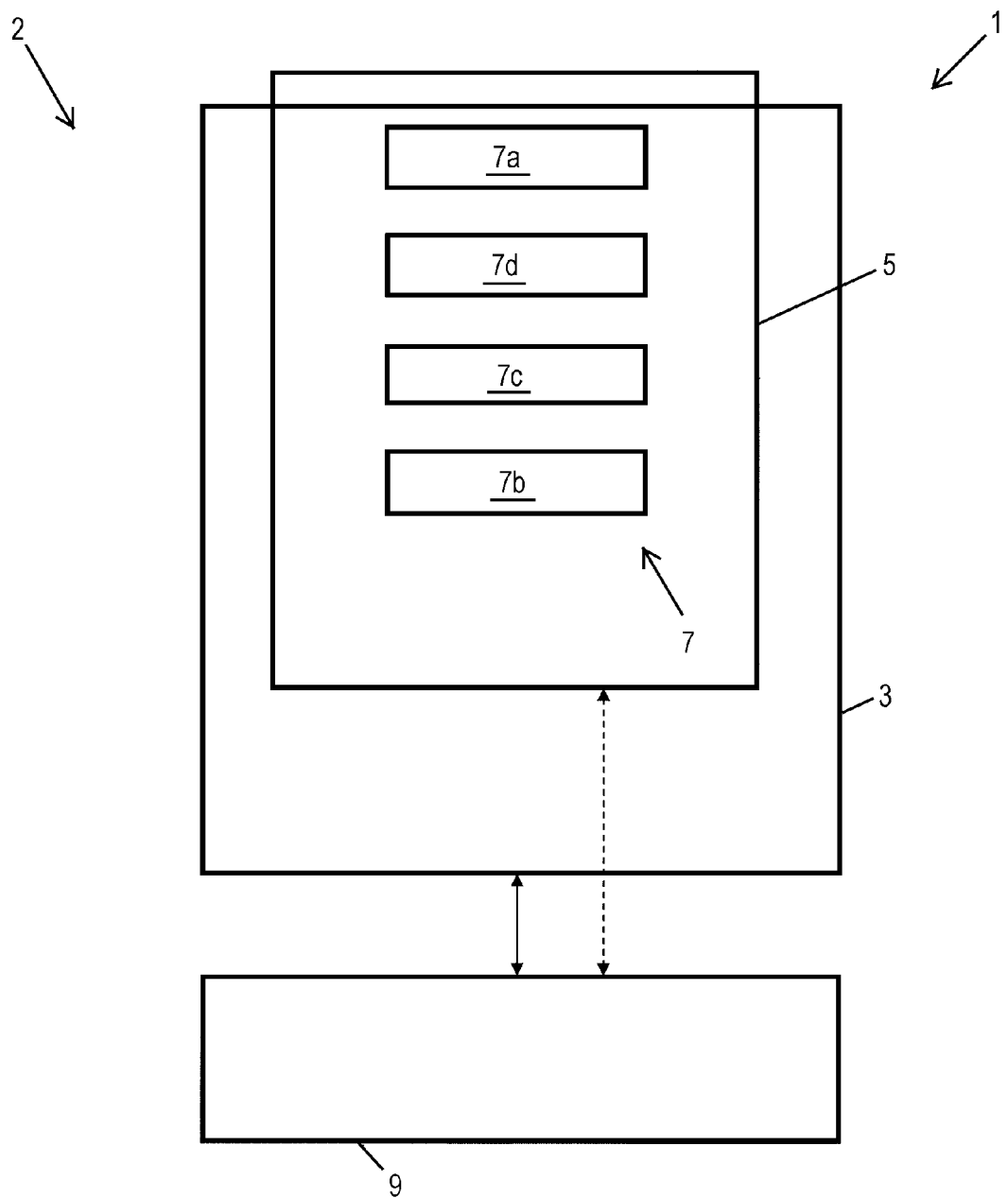
FIG. 1 is a schematic illustration of an irrigation system.

As schematically illustrated in FIG. 1, an irrigation sprinkler 1 can include an outer case 3. The outer case 3 can have a generally cylindrical shape or some other appropriate shape. A riser 5 can be positioned at least partially within the outer case 3. In some embodiments, such as pop-up sprinklers, the riser 5 is biased to a contracted or non-irrigating position within the outer case 3. The riser 5 may be biased to the contracted position by gravity and/or biasing structures such as springs. In some embodiments, the riser 5 transitions to an extended or irrigating position when pressure (e.g., water pressure) within the outer case 3 is high enough to overcome a biasing force on the riser 5. In some embodiments (e.g., non-pop-up sprinklers) the riser 5 is fixed in the extended position.

One or more mechanical components 7 can be positioned within the riser 5 and/or within the outer case 3. For example, the riser 5 can include an outlet 7a (e.g., a nozzle or outlet port). In some embodiments, the sprinkler 1 includes a plurality of outlets. The outlet 7a can direct water from the irrigation sprinkler 1 when the sprinkler 1 is ON. In some embodiments, the outlet 7a is connected to an outlet housing (e.g., a nozzle turret). The outlet housing and/or outlet 7a can be rotatable or otherwise moveable with respect to the riser 5 and/or outer case 3.

In some embodiments, the irrigation sprinkler 1 includes a turbine 7b. The turbine 7b can rotate in response to water entering an inlet end of the riser 5 and/or the outer case 3. The turbine 7b can be configured to rotate the outlet 7a. In some embodiments, a gear train reduction 7c is connected to the turbine 7b via an input shaft or otherwise. The gear train reduction 7c can transfer torque from the rotating turbine 7b to the outlet housing and/or outlet 7a via an output shaft, output clutch, or other output structure.

The sprinkler 1 can include a reversing mechanism 7d. The reversing mechanism 7d can be positioned within the riser 5 and/or within the outer case 3. In some embodiments, the reversing mechanism 7d is connected to the gear train reduction 7c and/or to the outlet 7a. The reversing mechanism 7d can be used to reverse the direction of rotation of the outlet 7a. In some embodiments, the reversing mechanism 7d reverses the direction of rotation of the outlet 7a without changing the direction of rotation of the turret 7b. In some embodiments, the reversing mechanism 7d reverses the direction of rotation of the outlet 7a by reversing the direction of rotation of the turret 7b.

In some embodiments, the reversing mechanism 7d reverses the direction of rotation of the outlet 7a via manual input. For example, a tool may be used to adjust the reversing mechanism 7d to reverse the direction of rotation of the outlet 7a. In some embodiments, the reversing mechanism 7d reverses the direction of rotation of the outlet 7a automatically via selected arc limiters.

Water may be provided to the sprinkler 1 via one or more water sources 9. The water source 9 may be fluidly connected to the outer case 3 and/or to the riser 5. In some embodiments, fluid communication between the water source 9 and the sprinkler 1 is controlled by one or more controllers, valves, or other apparatuses.

Figure 2:
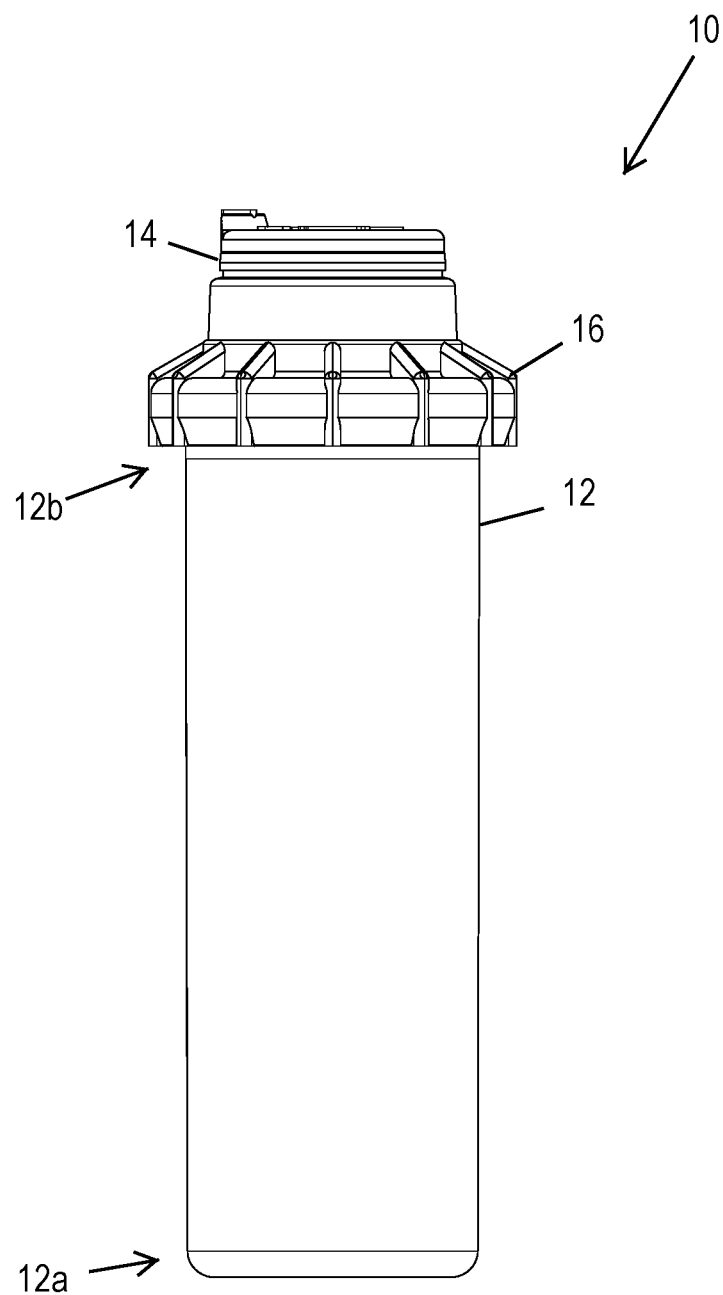
FIG. 2 is a front plan view of an embodiment of a sprinkler.
Figure 3:
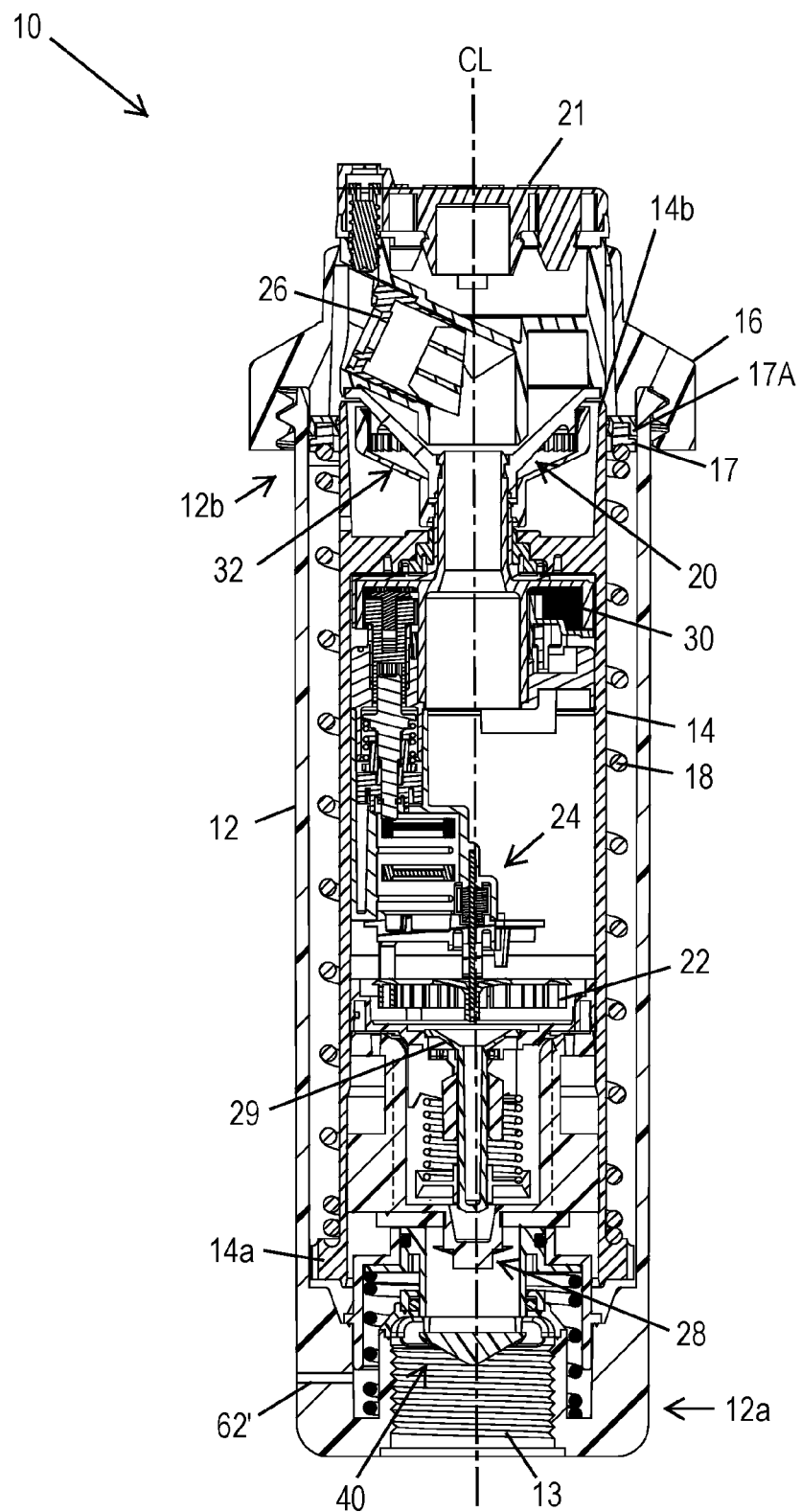
FIG. 3 is a vertical cross-sectional view of an embodiment of a sprinkler, wherein the riser is in a retracted position.
Figure 4:
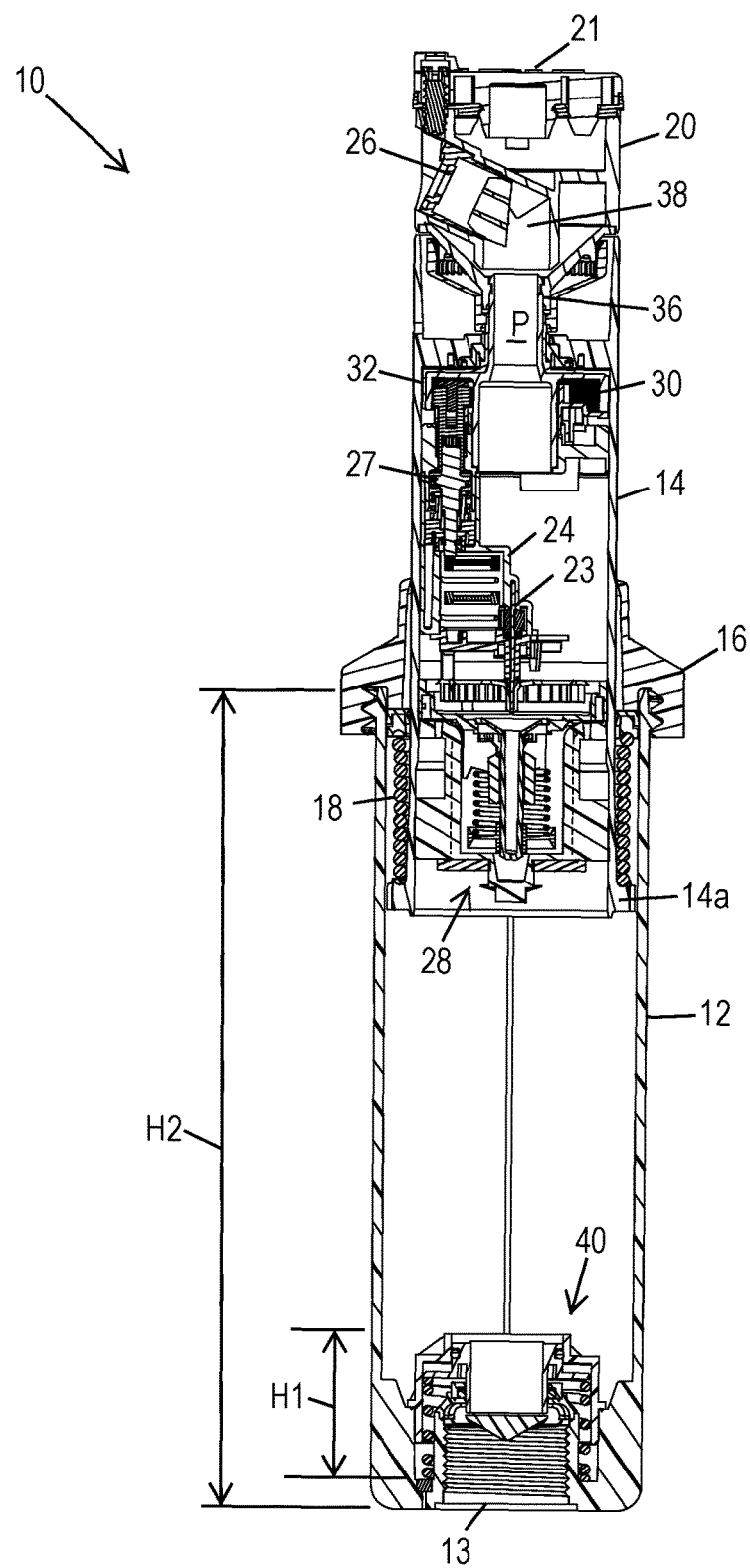
FIG. 4 is a vertical cross-sectional view of the sprinkler of FIG. 3, wherein the riser is in an extended position.

Referring to FIGS. 2-4, a sprinkler 10 according to certain embodiments is shown. As will be understood, the sprinkler 10 can include main components such as those shown above. Namely, an outer case, a riser, an outlet, a turbine, a gear train reduction, and/or a reversing mechanism. As will be described in more detail below, the sprinkler 10 can also include a pressure regulator. The pressure regulator can be used to maintain a predetermined water pressure at one or more locations within the sprinkler 10. Certain of the illustrated features of the sprinkler will now be described, though they may not be part of all embodiments.

Referring to FIGS. 2-4, a sprinkler 10 can include a cylindrical outer case 12 having a first end 12a and a second 12b. In some embodiments, the sprinkler 10 includes a tubular riser 14 telescopically extendible from the outer case 12 through the second end 12b of the outer case 12 between a retracted position (e.g., see FIG. 3) and an extended position (e.g., see FIG. 4). For example, the riser 14 can be housed at least partially within an interior of the outer case 12 and can be extended outward from the outer case 12 by water pressure. The riser 14 can have a first end 14a and a second end 14b and can be mounted co-axially with the case 12 (see, e.g., FIG. 3). The riser 14 can reciprocate along its central longitudinal axis CL with respect to the outer case 12. A cap 16 can be coupled with the second end 12b of the outer case 12. For example, the cap 16 can have internal female threads which engage with external male threads on the second end 12b of the outer case. The cap 16 can inhibit or prevent the riser 14 from de-coupling from the case 12, as further explained below.

In some embodiments, the sprinkler 10 includes a water outlet assembly 20 (e.g., a nozzle turret) mounted to the riser 14 at or near the second end 14b of the riser 14. The water outlet assembly 20 can be stationary (e.g., rotationally fixed) with respect to the riser 14 and/or the outer case 12. In some embodiments, the water outlet assembly 20 is rotatable with respect to the riser 14 and/or the outer case. The sprinkler 10 can include a turbine 22 mounted in the riser 14 and/or in the outer case 12 and rotatable in response to water flow through the sprinkler 10. The turbine 22 can be operably coupled to the water outlet assembly 20 to rotate the water outlet assembly 20 (e.g., about the longitudinal axis CL of the riser 14).

As illustrated in FIGS. 3 and 4, the sprinkler 10 can include a gear train reduction 24 operably coupled to the turbine 22 and to the water outlet assembly 20. The gear train reduction 24 can transfer torque between the turbine 22 and the water outlet assembly 20. In some embodiment, the sprinkler 10 includes a reversing mechanism 30 mounted in the riser 14 and/or in the outer case 12 to reverse a direction of rotation of the water outlet assembly 20 with respect to the riser 14.

In some embodiments, the sprinkler 10 includes a check valve 28 mounted in the riser 14 and/or in the outer case 12. The check valve 28 can be mounted in a fluid path between an inlet of the sprinkler 10 and an outlet (e.g., the water outlet assembly 20) of the sprinkler 10. The check valve 28 can inhibit or prevent low pressure water from passing through an outlet of the sprinkler 10 when the riser 14 is in a retracted position.

The case 12 can include an inlet 13 at or near the first end 12 of the outer case 12. The inlet 13 can coupled with a source of pressurized water. For example, the inlet 13 can have a threaded fitting (e.g., a female threaded inlet having internal threading extending into an interior of the case 12) configured to connect to a threaded fitting on a pipe or other water-carrying structure. The water-carrying structure can be connected to a source of pressurized water such as a solenoid-actuated valve (not illustrated). See, e.g., U.S. Pat. No. 5,979,863 granted Nov. 9, 1999 to Bradley M. Lousberg, the entire disclosure of which is hereby incorporated by reference herein.

The riser 14 can telescope parallel to the longitudinal axis CL through the end cap 16 to an extended position (e.g., see FIG. 4) when water pressure is applied at the inlet 13. In some embodiments, the sprinkler 10 includes a biasing structure configured to bias the riser 14 to a retracted position. For example, a spring 18 can be positioned within the case 12. One end of the spring 18 can be braced against the outer case 12 (e.g., near the second end 12b of the outer case 12) in a direction parallel to the longitudinal axis CL of the riser 14. For example, one end of the spring 18 can seat against a rigid retainer ring 17 held in place with respect to the outer case 12 by the end cap 16. In some embodiments, the end of the spring 18 seats in a downwardly opening annular groove in the retainer ring 17. Another end of the spring 18 can be braced against the riser 14 near the first end of 14a of the riser in a direction parallel to the longitudinal axis CL of the riser 14. For example, an end of the spring can seat in an upwardly opening annular groove formed in a shoulder at or near the first end 14a of the riser 14.

Extension of the riser 14 to an extended position can compress the spring 18. In some embodiments, interference between the end cap 16 and the spring 18 or first end 14a of the riser 14 can inhibit or prevent the riser 14 from exiting the outer case 12 when the riser 14 transitions to the extended position. When the water pressure is turned OFF the biasing force of the compressed spring 18 can push the riser 14 back to its retracted position illustrated in FIG. 3. In some embodiments, an elastomeric wiper seal 17a is positioned between the riser 14, the retainer ring 17, and the case 12. The wiper seal 17a can wipe water and/or debris from the outer surface of the riser 14 as the riser transitions from the extended position to the retracted position.

In some embodiments, as illustrated in FIGS. 3 and 4, the water outlet assembly 20 can include one or more ports or nozzles 26. In some embodiments, the one or more nozzles 26 are removable mounted in the water outlet assembly 20.

As illustrated in FIG. 4, the turbine 22 can be mounted to an input shaft 23 of a staggered gear train reduction 24 mounted in the riser 14. An arc-adjustable reversing mechanism 30 can be mounted in the riser 14 and can couple an output clutch 27 of the gear train reduction 24 and the water output assembly 20. The reversing mechanism 30 is one form of a gear driven coupling mechanism that can allow the gear train reduction 24 to adjust the mode of operation of the sprinkler 10 from the top-side thereof so that it will rotate the water output assembly 20 back and forth between selected arc limits to provide an oscillating sprinkler or rotate the water output assembly 20 in a continuous uni-directional manner. In some embodiments, a gear driven coupling can be used to rotate the water output assembly 20 in only an oscillating manner. In some embodiments, a gear driven coupling can be used to rotate the water output assembly 20 in only a continuous uni-directional manner. A spring-biased stator 29 can be mounted at or near the first end 14a of the riser 14 upstream of the turbine 22 for controlling the RPM of the turbine 22.

The reversing mechanism 30 is preferably of the type disclosed in U.S. Pat. No. 7,287,711 granted Oct. 30, 2007 to John D. Crooks. The entire disclosure of said U.S. Pat. No. 7,287,711 is hereby incorporated by reference. In some embodiments, the reversing mechanism is of one or more of the types of reversing mechanisms disclosed in U.S. Pat. Nos. 3,107,056; 4,568,024; 4,624,412; 4,718,605; and 4,948,052, all granted to Edwin J. Hunter, the entire disclosures of which are also hereby incorporated by reference. As explained in U.S. Pat. No. 7,287,711, an output shaft of the gear train reduction 24 can drive a set of four gears (not illustrated) that are rotatably supported on a frame so that they can rock back and forth with the aid of an over-center spring (not illustrated). This can allow the two gears on the outer ends of the frame to alternately engage the inside of a bull gear 32 to drive the same in a first direction and a second, opposite direction. The reversing mechanism 26 can allow a user to set the desired size of the arc of oscillation of the nozzle 18 from the top-side of the turret 20. This can be done, for example, by engaging a manual tool (not illustrated) with a slotted upper end of an arc adjustment shaft (not illustrated) that is accessible through a cross-shaped slit in an elastic cover 21 affixed to the top surface of the turret 20 and twisting the shaft to change the location of a movable arc adjustment tab (not illustrated) relative to a fixed arc adjustment tab (not illustrated). Optionally, maintenance personnel can convert the sprinkler 10 to a uni-directional mode in which allows full circle rotation of the nozzle 18. This can be done, for example, by manually twisting the arc adjusting shaft until the arc adjustment tabs overlap one another. Alternately, the reversing mechanism 26 may be built to only allow continuous rotation by not installing specific components during manufacturing, in which case the remaining components may function as a non-reversing gear driven coupling mechanism between the gear train reduction 24 and the nozzle 18.

As illustrated in FIG. 4, a vertically extending cylindrical bull gear stem 36 can be rotationally coupled in a concentric fashion with the bull gear 32 and can provide a hollow tubular drive shaft that couples to the water output assembly 20. The upper end of the bull gear stem 36 can be securely bonded in a cylindrical sleeve of the water output assembly 20. The water output assembly 20 and the nozzle 26 inserted therein thus can be supported for rotation relative to the riser 14 and the case 12 by the bull gear stem 36. An upper end of the bull gear stem 36 can terminate at or near a lower segment of a dog-legged tubular structure 38 formed in the water output assembly 20. The lower segment of the tubular structure 38 can be cylindrical and centered axially in the water output assembly 20. The nozzle 18 can be inserted into the upper inclined, radially extending segment of the tubular structure 38. The interior of the bull gear stem 36 may provide a relatively large central passage P that can convey water to the nozzle 26.

Pressure Regulator

The sprinkler 10 can include one or more pressure regulators. A pressure regulator can help to provide a constant outlet pressure over a wide range of inlet pressures to thereby provide for more even watering during an irrigation cycle. For example, as illustrated in FIGS. 3 and 4, a pressure regulator 40 can be mounted in the riser 14 and/or within the outer case 12. As illustrated in FIG. 3, the pressure regulator 40 may be mounted to the outer case 12. In some embodiments, the pressure regulator 40 maintains a substantially constant water pressure at one or more points within riser 14 and/or within the outer case 12 during operation of the sprinkler 10. In some embodiments, the pressure regulator 40 can serve as a check valve for the sprinkler 10 to inhibit or prevent low pressure water from passing through an outlet of the sprinkler 10 when the riser 14 is in a retracted position. As will be understood, the pressure regulator 40 can include main components such as a valve body moveable with respect to a regulator seat. The relationship between the valve body and the regulator seat can determine the amount of fluid flow through the pressure regulator which can vary depending on the pressure of fluid flowing therethrough. Certain of the illustrated features of the pressure regulator 40 will now be described, though they may not be part of all embodiments.

Figure 5:
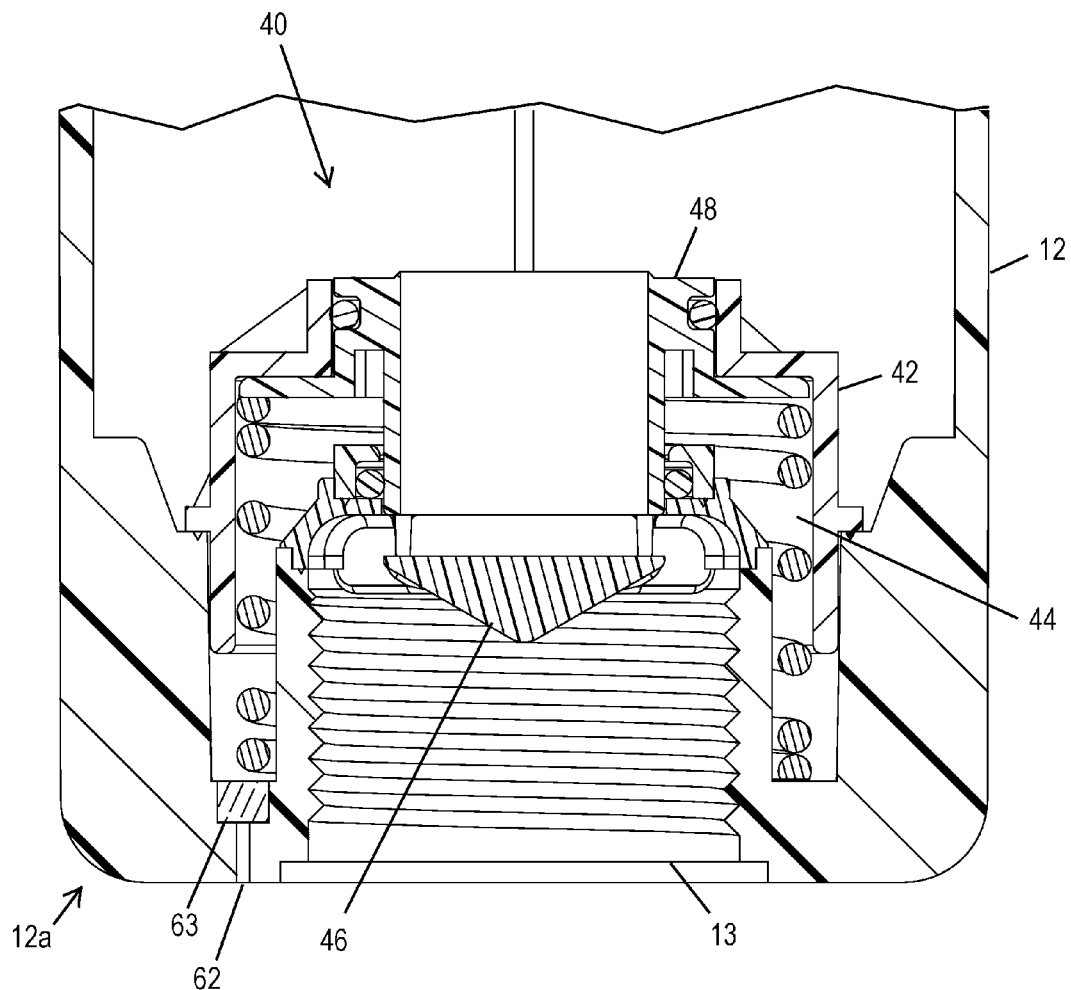
FIG. 5 is a detail view of a pressure regulator in a first position from the view of a vertical cross-sectional view the sprinkler of FIG. 4.

As illustrated in FIGS. 4 and 5, the pressure regulator 40 can be mounted to the inside of the outer case 12. In some embodiments, the pressure regulator 40 can be positioned around or surrounding the case inlet 13. This can allow the pressure regulator to utilize unused space within the outer case 12, while limiting the change in size of the sprinkler itself as compared to a sprinkler without a pressure regulator. The pressure regulator 40 can have a height H1 substantially parallel to the centerline CL of the riser 14. The height H1 of the pressure regulator 40 can be substantially smaller than the height H2 of the outer case 12. For example, the height H1 of the pressure regulator 40 can be greater than or equal to about 10% of the height H2 and/or less than or equal to about 40% of the height H2 of the outer case 12. In some embodiment, the height H1 of the pressure regulator 40 is approximately 22% of the height of the outer case 12. Many variations are possible. In some embodiments, use of a sprinkler 10 having a pressure regulator 40 with a height H1 substantially smaller than the height H2 of the case can reduce the cost of installing the sprinkler 10. For example, the irrigation lines connected to the sprinkler 10 may be positioned at a shallower location underground than irrigation lines connected to sprinklers having external pressure regulators or pressure regulators in the riser.

The pressure regulator can include a regulator housing 42 (FIG. 5). A valve seat 46 can be positioned within the regulator housing 42. The pressure regulator 40 can include a valve body 48 configured to move with respect to the regulator housing 42 and/or with respect to the valve seat 46.

Figure 6:
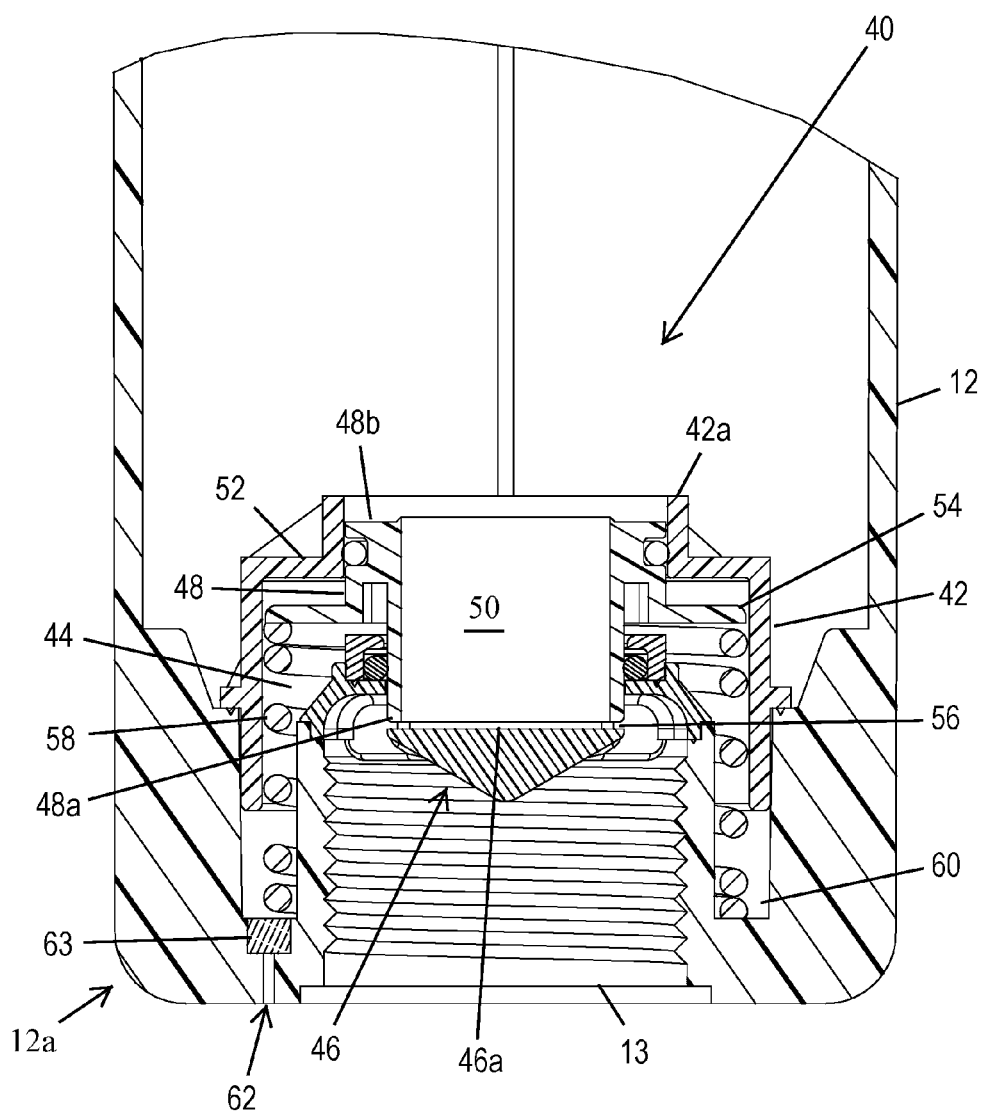
FIG. 6 is a vertical cross-sectional view of the pressure regulator of FIG. 5 in a second position.

The regulator housing 42 can be fixedly attached to the outer case 12. As compared to a riser with a pressure regulator, attaching the pressure regulator 40 to the outer case 12 advantageously reduces the weight of the riser 14. The weight of the riser is an important design consideration because of the large impacts experienced in a pop-up sprinkler between the extended and retracted positions. The regulator housing 42 may be part of or attached to the outer case 12 via welding, adhesives, threaded engagement, co-molding, and/or by any other attachment process or structure. In some embodiments, the regulator housing 42 has a stepped diameter that provides a shoulder at 52, as illustrated in FIG. 6. The regulator housing 42 can include a regulator outlet 42a through which water may flow. In some embodiments, the regulator housing 42 surrounds at least a portion of the case inlet 13. Positioning the regulator housing 42 and/or other pressure regulator components surrounding and/or coaxial with the case inlet 13 can utilize space surrounding the case inlet 13 that may otherwise remain unused. In some embodiments, positioning the regulator housing 42 at least partially surrounding the case inlet 13 can reduce the extent to which the pressure regulator 40 extends into the outer case 12.

Figure 8:
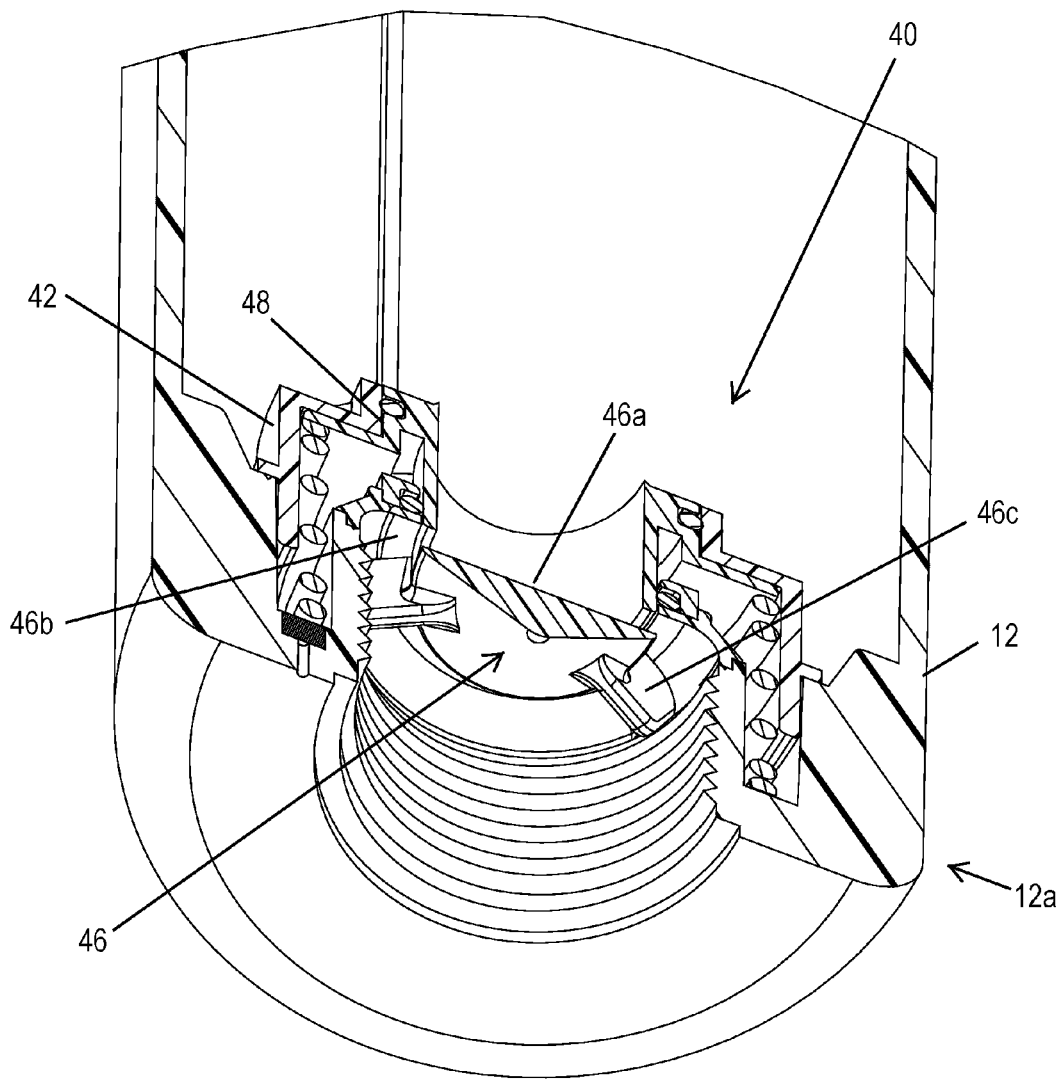
FIG. 8 is a partial bottom perspective cross-sectional view of the pressure regulator of FIG. 5.

The valve seat 46 can be mounted to the outer case 12. In some embodiments, the valve seat 46 is fixedly attached to the outer case 12 at or near the case inlet 13. In some embodiments, the valve seat 46 may be part of, welded to, adhered to, threadedly-engaged to, co-molded with, or otherwise attached to the outer case 12. The valve seat 46 may, in some embodiments, be attached to the regulator housing 42. In some embodiments, the valve seat 46 forms a monolithic part with the outer case 12 and/or with the regulator housing 42. As illustrated, the valve seat 46 can be positioned within the housing interior and/or the inlet interior. In some embodiments, the valve seat 46 is positioned in a fluid path between the case inlet 13 and the regulator outlet 42a. For example, as illustrated in FIGS. 6 and 8, the valve seat 46 can include a seating surface 46a. The seating surface 46a can be positioned adjacent or within the inlet 13. The valve seat 46 can include a seat collar 46b. The seat collar 46b can have an annular shape and can be attached to the outer case 12 (e.g., at or near the inlet 13). The seating surface 46a can be connected to the seat collar 46b via one or more ribs 46c (e.g., see FIGS. 8 and 9). The one or more ribs 46c may extend radially (e.g., with respect to the centerline CL) between the seating surface 46a and the seat collar 46b.

As illustrated in FIGS. 5-6, the valve body 48 may be mounted at least partially within the regulator housing 42. In some embodiments, the valve body 48 is positioned downstream of the valve seat 46 and/or between the valve seat 46 and the riser 14. The valve body 48 can be configured to move (e.g., linearly reciprocate) with respect to the valve seat 46 and/or with respect to the regulator housing 42. In some embodiments, the valve body 48 moves in response to changes in water pressure within the riser 14 and/or within the outer case 12. In some embodiments, the valve body 48 has a generally tubular (e.g., cylindrical) shape. The valve body 48 can define a valve channel 50 through which water may flow. As explained in more detail below, movement of the valve body 48 within the pressure regulator 40 can regulate the water pressure within the riser 14 and/or within the outer case 12 of the sprinkler 10.

The valve body 48 can be configured to translate in a first direction away from the valve seat 46 and in a second direction toward the valve seat 46. As shown, the valve body 48 can be biased to an open position. In the open position the valve body 48 is forced into contact with the regulator housing 42. In some embodiments, the regulator housing 42, or some portion thereof, inhibits or prevents movement of the valve body 48 in the first direction to limit the extent to which the valve body 48 can move in the first direction. For example, the shoulder 52 can interfere with a flange 54 or other structure on the valve body 48 when the valve body 48 moves in the first direction. Interference between the flange 54 and the shoulder 52 can limit movement of the valve body 48 in the first direction to a first position. In some embodiments, movement of the valve body 48 in the second direction is limited by interference between the valve body 48 and the valve seat 46. For example, the seating surface 46a of the valve seat 46 can have a diameter that is greater than or equal to an inner diameter of a first end 48a of the valve body 48. Interference between the valve body 48 and the valve seat 46 can limit movement of the valve body 48 in the second direction to a second position. In some embodiments, movement of the valve body 48 in the second direction is limited by interference between the valve body 48 and a portion (e.g., a shoulder or flange) of the regulator housing 42 and/or some other structure of the pressure regulator 40 and/or of the sprinkler 10.

The pressure regulator 40 can have a valve inlet 56. In some embodiments, the valve inlet 56 is positioned at or near the inlet 13 of the outer case 12. The pressure regulator 40 can be configured to vary the size of the valve inlet 56 in response to changes in water pressure within the riser 14 and/or within the outer case 12. For example, increasing the size of the valve inlet 56 can permit an increased amount of water to enter the outer case 12. Increased water flow into the outer case 12 can increase the water pressure within the outer case 12 and/or within the riser 14. On the other hand, decreasing the size of the valve inlet 56 can restrict or reduce the amount of water entering the outer case 12. Reducing the amount of water entering the outer case 12 can reduce the water pressure within the outer case 12 and/or within the riser 14.

As illustrated in FIG. 6, the valve inlet 56 can be defined or bounded by the valve seat 46 (e.g., the seating surface 46*a*) and the first end 48*a* of the valve body 48. Movement of the valve body 48 in the first direction, away from the valve seat 46, can increase the size of the valve inlet 56. Movement of the valve body 48 in the second direction, toward the valve seat 46, can decrease the size of the valve inlet 56.

In some embodiments, the valve body 48 is biased to the first, open position by a biasing structure. For example, a spring 58 (e.g., a coil spring) or other biasing structure can exert force on some portion of the valve body 48 in the first direction. In some embodiments, one end of the spring 58 is braced against a portion of the casing 12 (e.g., within a spring seat 60 formed between the case inlet 13 and an outer wall of the case 12) or other fixed structure and the other end of the spring 58 is braced against a portion (e.g., the flange 54) of the valve body 48. In the illustrated embodiment, the spring 58 is positioned coaxially with and surrounding at least a portion of the tubular body of the valve body 48. Preferably, the spring 58 surrounds at least a portion of the case inlet 13. As illustrated, the pressure regulator 40 can have a compact arrangement wherein the valve body 48, spring 58, and/or regulator housing 42 are coaxial and overlap each other in a direction substantially parallel to the centerline CL of the riser 14.

Figure 7:
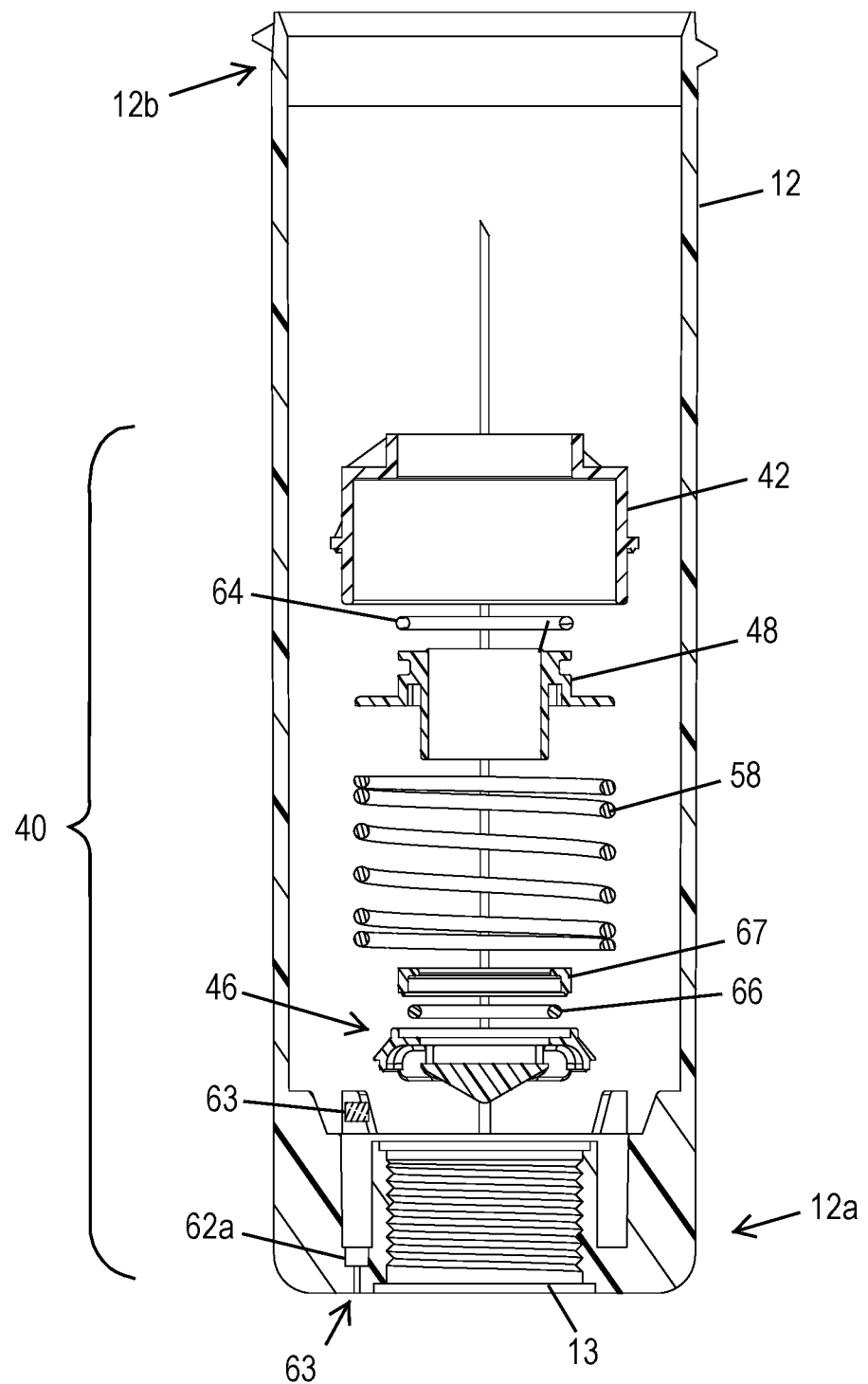
FIG. 7 is an exploded vertical cross-sectional view of the pressure regulator of FIG. 5.

In some embodiments, at least a portion or one side of the area of the pressure regulator housing the biasing structure can be vented to the atmosphere. In this way air pressure build-up around the valve member can be prevented or reduced. As illustrated in FIGS. 6 and 7, the flange 54 is positioned in a chamber 44 of the housing interior which is maintained at ambient pressure via a vent 62 between the chamber 44 and the exterior of the case 12. The vent 62 can be positioned at the first end 12*a* of the outer case 12. In some embodiments, the vent 62 extends downward through the first end 12*a* of the outer case 12. In some embodiments, a vent 62' can extend through a sidewall of the outer case 12 at or near the first end 12*a* of the outer case (see, e.g., FIG. 3).

In some embodiments, a filter 63 can be positioned in the vent 62 (e.g., in filter chamber 62*a* as can be seen in FIG. 7). The filter 63 can inhibit or prevent debris from entering the pressure regulator 40. The vent 62 can communicate directly with the soil surrounding the sprinkler 10 when it is buried in the ground. The air displaced by the pressure regulator 40 can be absorbed in the soil and can ultimately communicate with atmospheric pressure. In some cases, the sprinkler 10 is mounted above the soil and the vent 62 communicates directly to the air outside the sprinkler 10.

One or more seals on the valve body 48, on the valve seat 46, and/or on the regulator housing 42 can fluidly isolate the chamber 44 from the interior of the sprinkler 10. For example, a first O-ring 64 can be positioned surrounding a radially-outward portion of the valve body 48 at or near the second end 48*b* of the valve body 48. The first O-ring 64 can form a seal between an outer surface of the valve body 48 and an inner surface of the regulator housing 42 at or near the regulator outlet 42*a*. In some embodiments, the first O-ring 64 is fixed to the regulator housing 42 in a direction substantially parallel to the direction of movement of the valve body 48. In some embodiments, the first O-ring 64 is fixed to the valve body 48 in a direction substantially parallel to the direction of movement of the valve body 48. A second O-ring 66 can be positioned around an outer portion of the valve body 48 at or near the first end 48*a* of the valve body 48. The second O-ring 66 can form a seal between the valve body 48 and a portion of the valve seat 46 (e.g., the seat collar 46*b*). In some embodiments, the second O-ring 66 can be fixed to a portion of the valve seat 46 (e.g., via an O-ring retainer 67 attached to the seat collar 46*b* or to some other portion of the valve seat 46) in a direction substantially parallel to the direction of movement of the valve body 48. In some embodiments, the second O-ring 66 can be fixed to the valve body 48 in a direction substantially parallel to the direction of movement of the valve body 48. As illustrated, the spring 58 may overlap second O-ring 66 and/or the valve seat 46. Overlap of the spring 58 with the second O-ring and/or valve seat 46 can reduce the overall height of the pressure regulator 40.

Introduction of water into the sprinkler 10 via the case inlet 13 can increase the water pressure within the sprinkler 10 (e.g., within the riser 14 and/or within the outer case 12). As illustrated in FIG. 6, an engagement surface 48*b*, shown here as a second (e.g., upper) end 48*b* of the valve body 48 can have a greater radial thickness and/or greater cross-sectional area than the first end 48*a* of the valve body 48. In some such embodiments, water pressure within the sprinkler 10 exerts a greater force on the engagement surface 48*b* of the valve body 48 than on other parts of the valve body 48, producing a net pressure force on the valve body 48 toward the valve seat 46. In some such embodiments, water pressure within the sprinkler 10 exerts a greater force on the second end 48*b* of the valve body 48 than on the first end 48*a* of the valve body 48, producing a net pressure force on the valve body 48 toward the valve seat 46.

At relatively low water pressure the spring 58 biases the valve body 48 of the pressure regulator 40 in the first direction away from the valve seat 48 to a fully open configuration, as illustrated in FIG. 6, allowing maximum water flow. When the net pressure force on the valve body 48 exceeds the biasing force of the spring 58, the valve body 48 moves in the second direction, toward the valve seat 46. In some embodiments, the biasing force of the spring 58 increases as the valve body 48 moves toward the valve seat 46, as the spring force within the spring 58 increases as the spring 58 is compressed.

As explained above, movement of the valve body 48 toward valve seat 46 reduces the size of the valve inlet 56. Reducing the size of the valve inlet 56 can reduce the flow rate of water into the sprinkler 10, reducing the water pressure within the sprinkler 10, within the riser 14, and/or within the case 12. Reduction of water pressure within the sprinkler 10 can reduce the net pressure force on the valve body 48. When the net pressure force on the valve body 48 is reduced, the biasing force of the spring 58 can move the valve body 48 toward the first, open position. The net pressure force and biasing force of the spring 58 can move the valve body 48 back and forth between the first (e.g., open) position and second (e.g., closed) position to maintain a substantially constant water pressure in the riser 14, and/or within the outer case 12. The biasing force of the spring 58 can inhibit or prevent prolonged complete closure of the valve inlet 56. For example, complete closure of the valve inlet 56 can cause the water pressure in the sprinkler 10 to drop and cause the net pressure force on the valve body 48 to reduce. As explained above, reduction in the net pressure force on the valve body 48 can permit the biasing force of the spring 58 to move the valve body 48 in the first direction away from the valve seat 46, opening the valve inlet 56.

The pressure regulator 40 can be a fixed pressure regulator in that the components thereof can be configured and dimensioned to limit the water pressure at the entrance of the nozzle 18 to a predetermined desired water pressure. Achieving a predetermined water pressure at the entrance of the nozzle 18 may require that the strength of the spring 58 be carefully selected. A fixed pressure regulator is often specified by customers in large installations such as recreational parks, playing fields, apartment complexes and industrial parks.

Regulating the water pressure inside the sprinkler 10 can result in substantial water savings. The pressure regulator 40 can ensure that the desired amount of water, in terms of gallons per hour, is distributed onto turf and landscaping by the sprinkler 10 independent of fluctuations, within a selected range, in the pressure of the water supplied at the inlet 13. The pressure of the water supplied by a municipality can vary, for example, from thirty PSI to over one hundred PSI. Where the water is pumped from a well, there may also be pressure fluctuations. In addition, the water pressure encountered by the sprinkler 10 can vary depending upon how many sprinklers are attached to a given pipe and how far away from the source of pressurized water the sprinkler 10 is connected, and how many sprinklers are connected to the branch pipe upstream from the sprinkler 10. Moreover, the water pressure at the sprinkler 10 can vary depending on the grade. For example, if the pipe rises in elevation to the location where the sprinkler 10 is connected, the water pressure at the sprinkler 10 will be lower than it would if the sprinkler 10 were connected to the pipe at a lower elevation.

Rotor-type sprinklers operate at their optimum performance when the water pressure is controlled because the flow rate through the nozzle 18 or other outlet port is dependent upon the water pressure at the entrance to the nozzle 18. The size of the orifice in the nozzle 18 is carefully sized and configured to produce the desired flow rate in terms of gallons per hour. See U.S. Pat. No. 5,456,411 granted Oct. 10, 1995 to Loren W. Scott et al., U.S. Pat. No. 5,699,962 granted Dec. 23, 1997 to Loren W. Scott et al. and U.S. Pat. No. 6,871,795 granted to Ronald H. Anuskiewicz on Mar. 29, 2005, the entire disclosures of which are hereby incorporated by reference.

Positioning the pressure regulator 40 adjacent to and/or surrounding the inlet 13 of the case 12 can maintain the water pressure inside the outer case 12 and the water pressure supplied to drive the turbine 22 at optimum pressures to improve sprinkler life. The pressure regulator 40 may reduce the cost of providing a pressure regulated rotor-type sprinkler compared to the cost of attaching a separate pressure regulator near the inlet 13 but externally of the sprinkler. In some embodiments, the pressure regulator 40 reduces the sprinkler height otherwise required to provide a rotor-type sprinkler with a pressure regulator if a pressure regulator were installed externally, directly beneath the sprinkler.

Utilizing the space surrounding and/or in-line with the inlet 13 for the pressure regulator can provide a more compact sprinkler than if the pressure regulator were positioned elsewhere. For example, one or more components of the pressure regulator can be positioned between a wall forming the inlet and a wall of the outer case. As shown in FIGS. 5 and 6, the side wall of the outer case and the wall forming the inlet are parallel. The spring 58 is shown positioned in the space between these two walls, though other components including, but not limited to, O-rings and portions of the regulator housing 42 and the valve body 48 can also be positioned in this space. This space can be a ring-like space encircling the inlet, though it can also have other shapes. Thus, spring can be a helical spring positioned within a ring-like space encircling the inlet. In addition, it can be seen that the spring 58 is positioned adjacent to the threaded portion of the inlet wall and the ring-like space encircling the inlet can also encircle the threaded portion of the inlet.

In some embodiments, one or more of the valve seat 46 and the valve body 48 can be positioned within the inlet. The inlet 13 can be a female threaded inlet and one or more of the valve seat 46 and the valve body 48 can be positioned within the threaded portion of the inlet. As shown, the valve seat 46 is partially positioned within the threaded portion. The valve seat 46 and valve body 48 can be sized to fit within a male threaded pipe used to connect to the female threaded inlet. In some embodiments, the orientation of the valve body 48 and valve seat 48 can be reversed. In such embodiments, the valve body may be positioned within the inlet and may optionally be within the threaded portion of the inlet, while the valve seat can be outside of or within the inlet.

Figure 14:
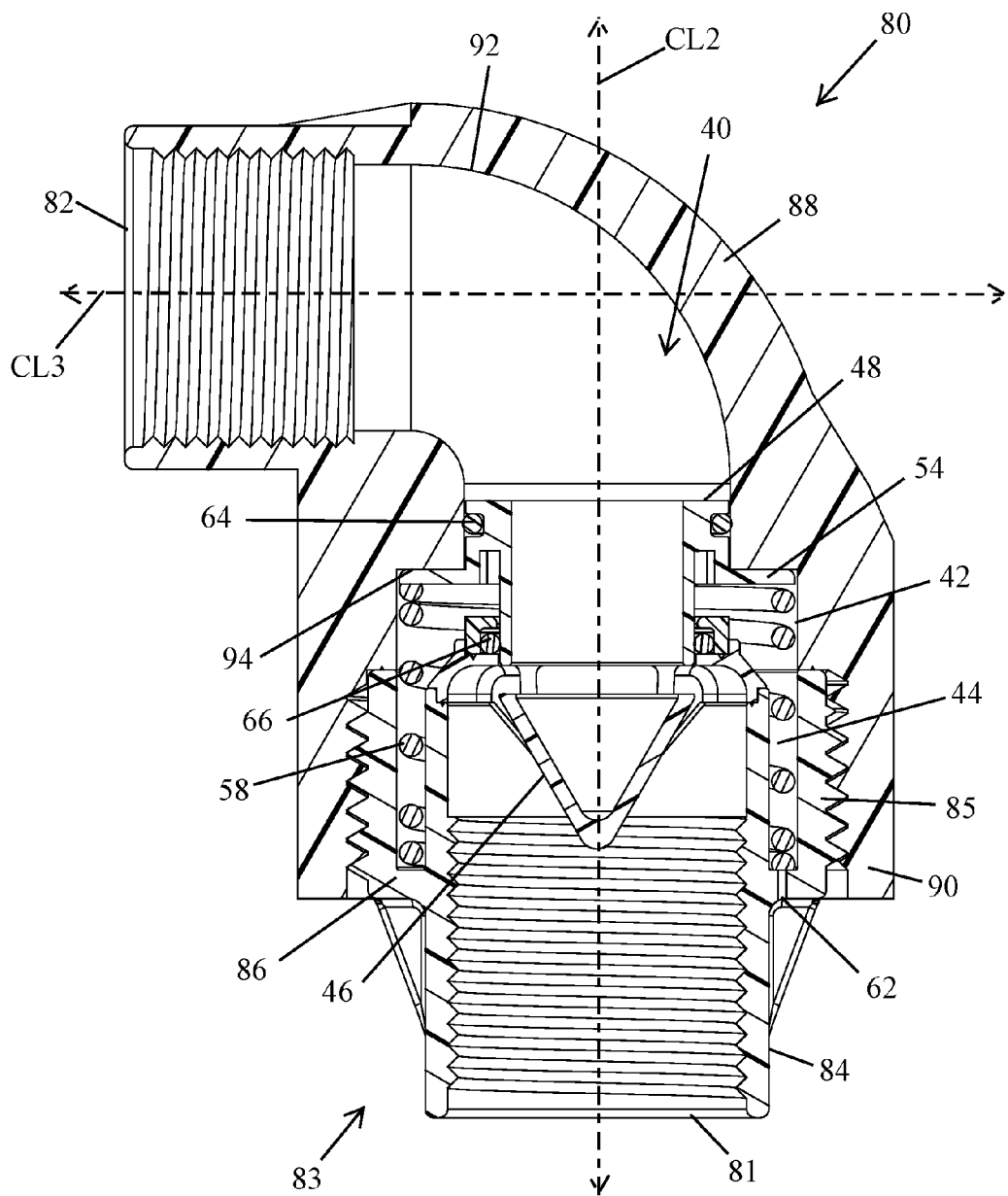
FIG. 14 is a vertical cross-sectional view of an embodiment of a pressure regulator assembly having an outlet oriented at an angle from an inlet.
Figure 15:
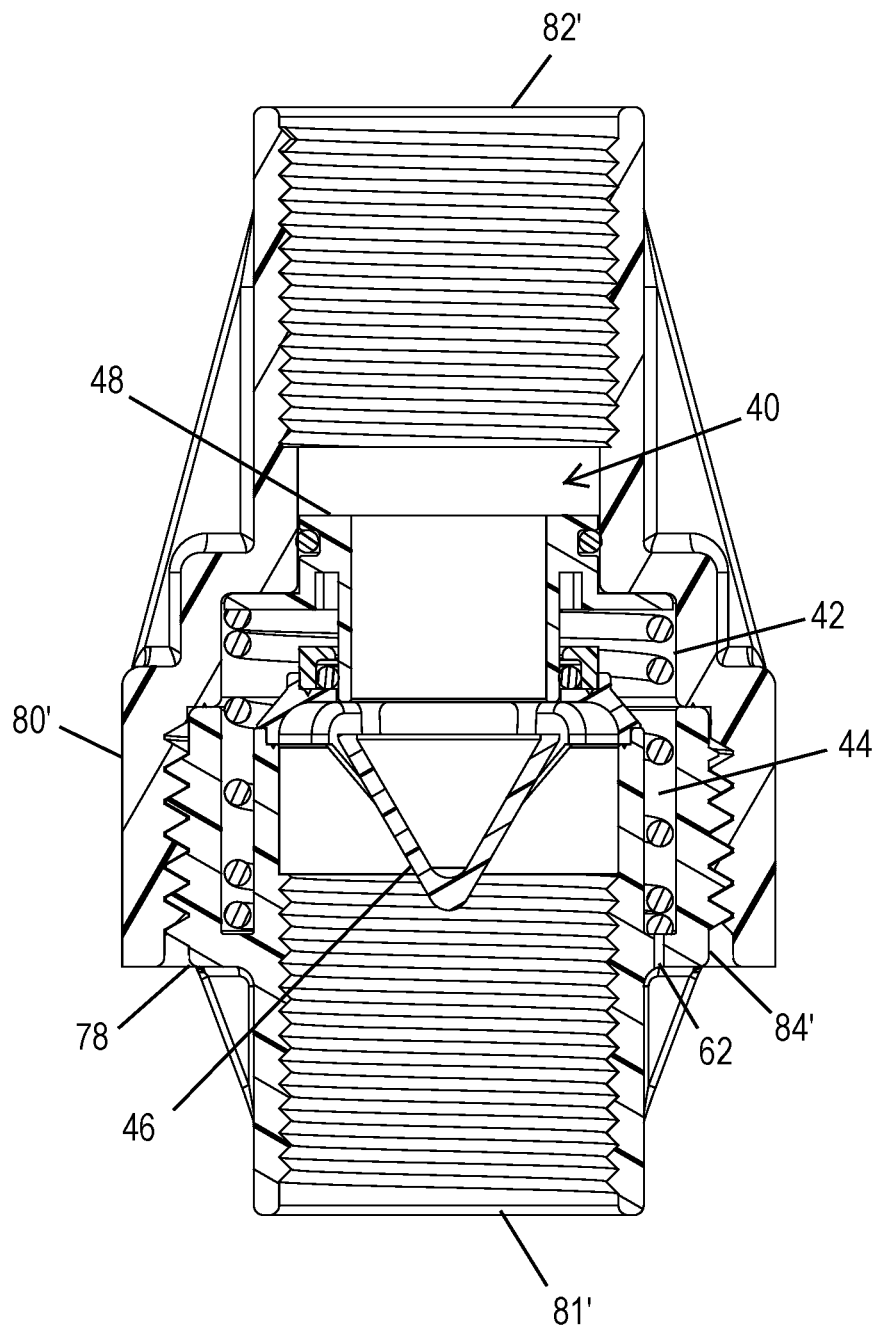
FIG. 15 is a vertical cross-sectional view of an embodiment of a pressure regulator assembly having an outlet oriented parallel to an inlet.

Though the description of ways to incorporate a pressure regulator into a sprinkler herein focus on its relationship to the inlet, it will be understood that a pressure regulator can be similarly positioned with respect to an outlet for a sprinkler or other irrigation component. For example, the standalone pressure regulators described with respect to FIGS. 14-15 are but a few examples where the pressure regulator can be positioned in-line with and/or surrounding the outlet.

Figure 9:
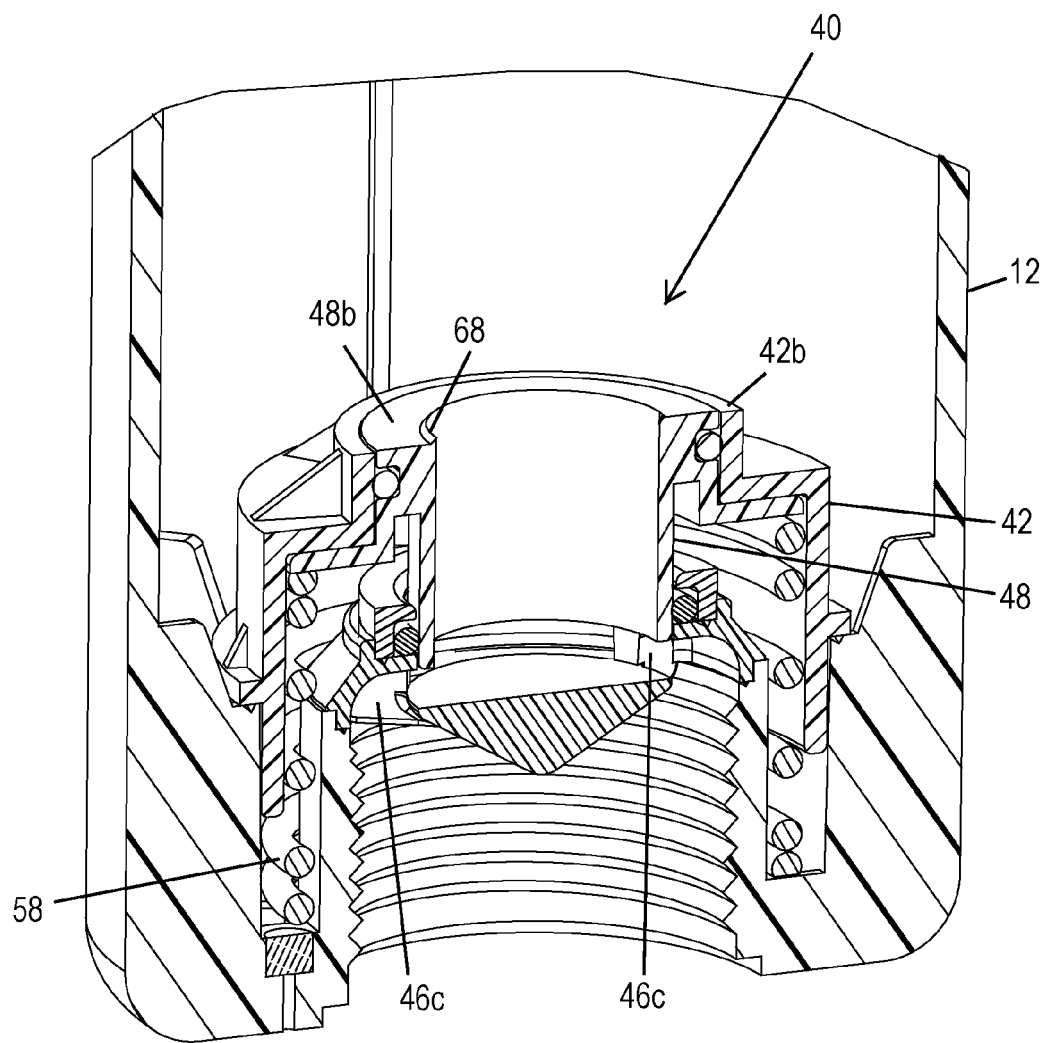
FIG. 9 is a top perspective cross-sectional view of the pressure regulator of FIG. 5.
Figure 10:
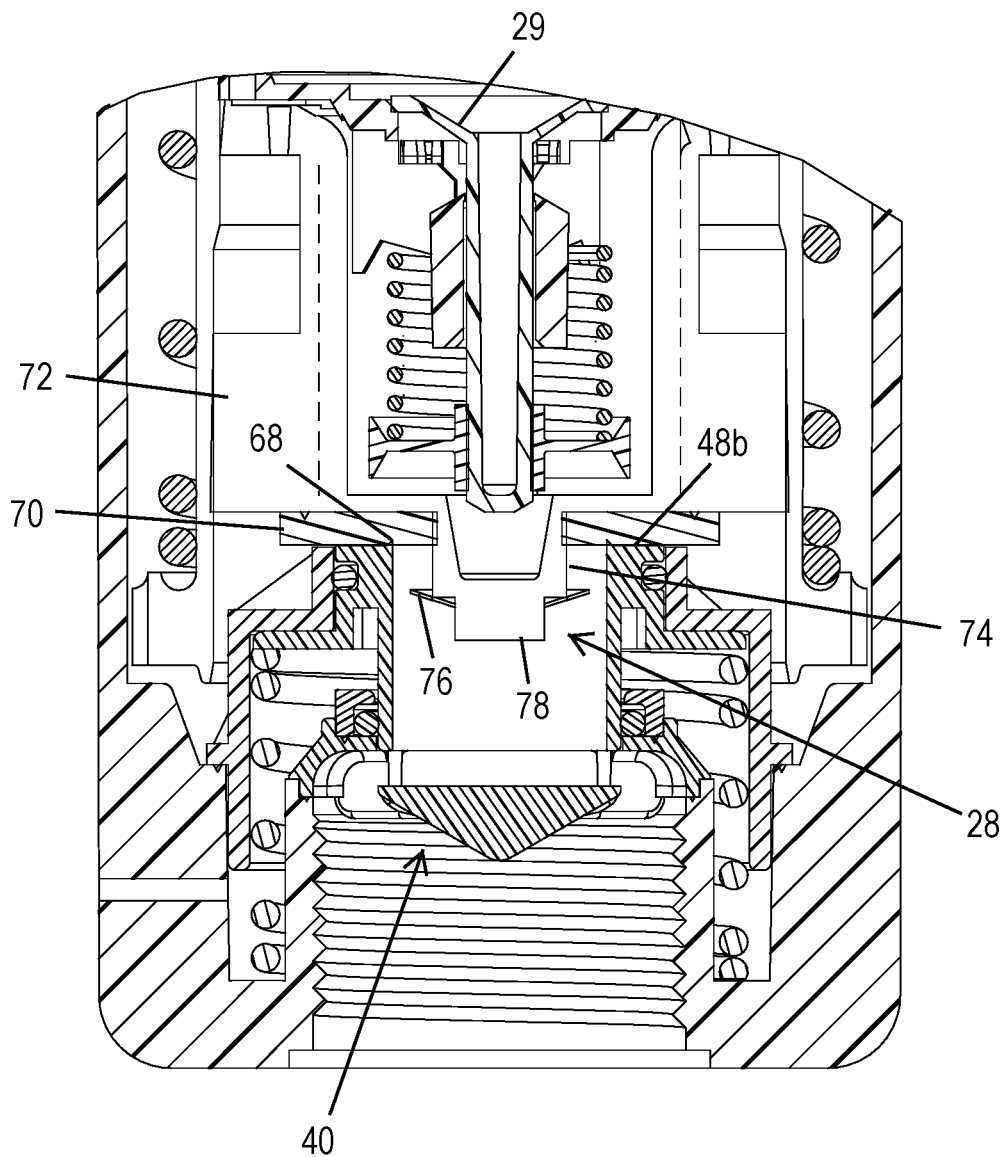
FIG. 10 is a detail view of the pressure regulator and check valve from the vertical cross-sectional view of the sprinkler of FIG. 3.

In some embodiments, as illustrated in FIGS. 9 and 10, the pressure regulator 40 provides a riser seat 68 for the sprinkler 10. As best seen in FIG. 9, the second end 48b of the valve body 48 can extend beyond the regulator outlet 42a of the regulator housing 42 when the valve body 48 is moved by spring 58 to its first position (e.g., open position). A riser seat 68 can extend from the second end 48b of the valve body 48 in a direction opposite the valve seat 46. When water flow is removed from the inlet 13, the spring 18 can cause the riser 14 to retract into the outer case 12. As the riser 14 retracts, the check valve 28, or some portion of the riser 14 can contact the riser seat 68. For example, an elastomeric seal 70 of the check valve 28 can come into contact with the riser seat 68 as the riser 14 transitions to its retracted position. The elastomeric seal 70 can compress slightly and the valve body 48 can begin to compress the spring 58 as the riser 14 forces the valve body 48 downward (e.g., toward the valve seat 46). The biasing force of spring 58 can decelerate the riser 14 as the riser 14 retracts to its fully retracted position. In the fully retracted position, the elastomeric seal 70 can contact an upper surface of the regulator housing 42 (e.g., an upper surface of regulator outlet 42a). Contact between the check valve 28 and the valve body 48 can decelerate the riser 14 as it retracts to reduce the shock loads that can occur when the riser 14 stops at its fully retracted position, as illustrated in FIGS. 3 and 10.

In some embodiments, the check valve 28 inhibits or prevents low pressure water from flowing through the sprinkler 10. Inhibiting or preventing low pressure water from flowing through the sprinkler 10 can reduce the likelihood of water to emitting from the fully retracted sprinkler after the water supply is turned off. This can be important when other sprinklers on the same pipe are installed at a higher elevation in the landscape. Without the check valve, low pressure water from the elevated portion of the piping may flow to the lowest sprinkler and cause puddling around that sprinkler.

As illustrated in FIG. 10, the check valve 28 can include a check valve stem 74. The resilient elastomeric seal 70 can be placed over the check valve stem 74 and held in position by a spring clip 76 or other retaining structure which is secured over the check valve stem 74. In some embodiments, the check valve stem 74 is attached to or integrally formed with a dirty water screen 72. For example, the check valve stem 74 can be formed on the bottom (e.g., the end nearest the pressure regulator 40) of the dirty water screen 72. The dirty water screen 72 can be removably placed in contact with an interior wall of riser 14. The dirty water screen 72 can surround a portion of the spring-biased stator 29.

Figure 11:
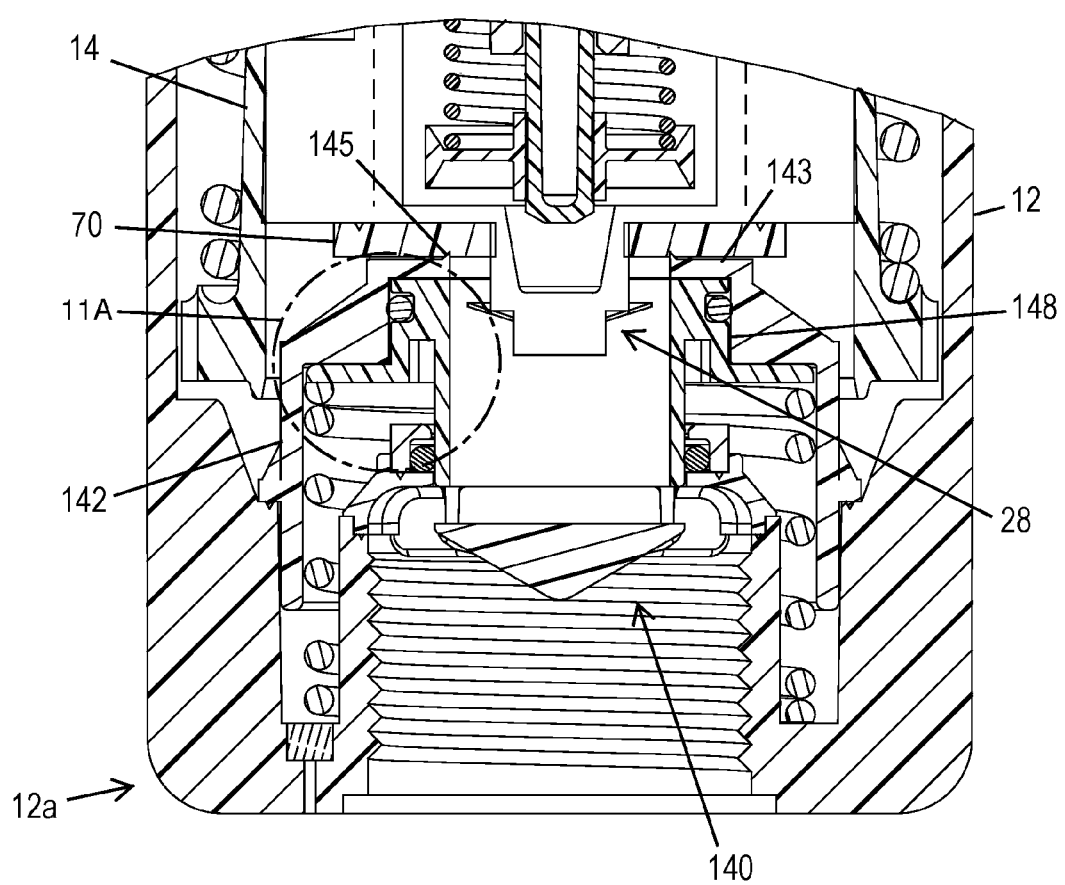
FIG. 11 is a detail view of another embodiment of a pressure regulator in a first position from a vertical cross-sectional view.
Figure 12:
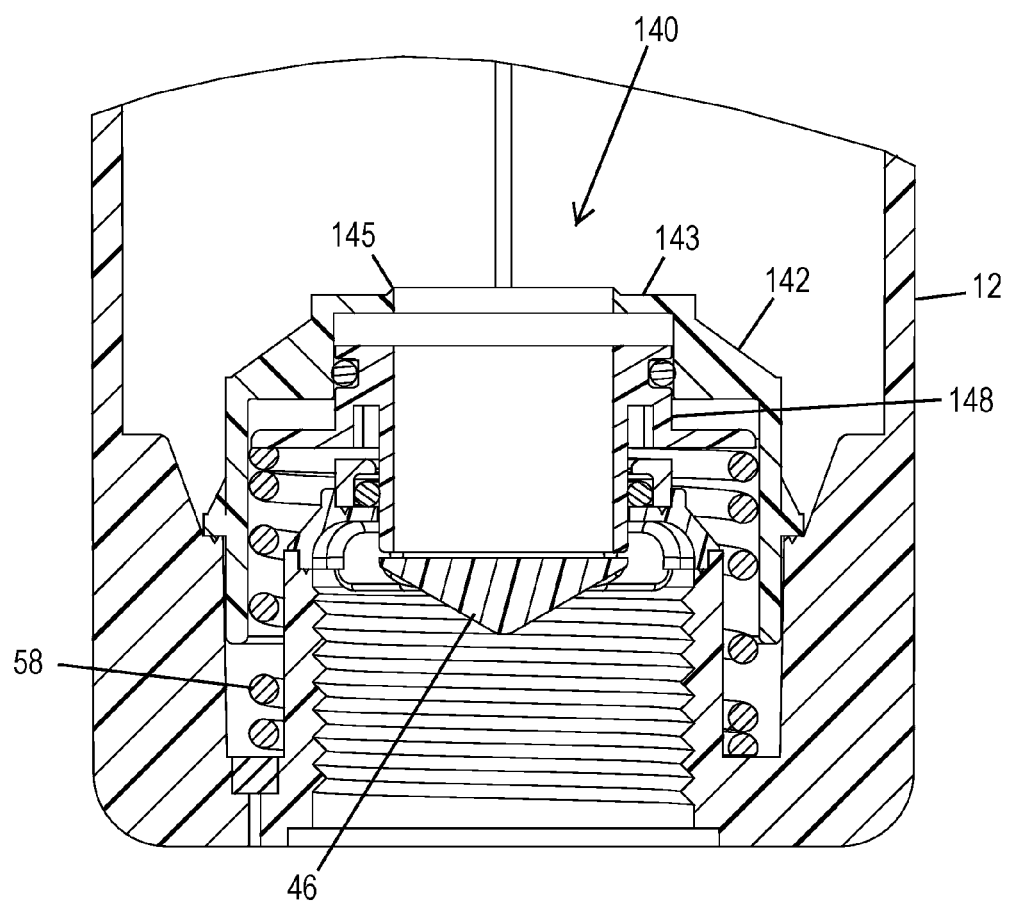
FIG. 12 is a vertical cross-sectional view of the pressure regulator of FIG. 11 in a second position.

FIGS. 11-12 illustrate another embodiment of a pressure regulator 140 in the outer case 12. The operation of the pressure regulation portion of the pressure regulator 140 is similar to or the same as described earlier for the pressure regulator 40. One difference between the pressure regulator 40 and the pressure regulator 140 is in riser retraction operation. Pressure regulator 140 includes a regulator housing 142. An upper cap 143 is formed at the top (e.g., the end further from the inlet 13) of the regulator housing 143 to support a riser seat 145. When the riser 14 is fully retracted, the elastomeric seal 70, or some other portion of the riser 14, contacts the riser seat 145, as illustrated in FIG. 11. In this embodiment, the riser seat 145 is formed at the top of the regulator housing 142 which is attached to the interior of the outer case 12. In this embodiment, the riser seat is not formed on the valve body 148.

Figure 11A:
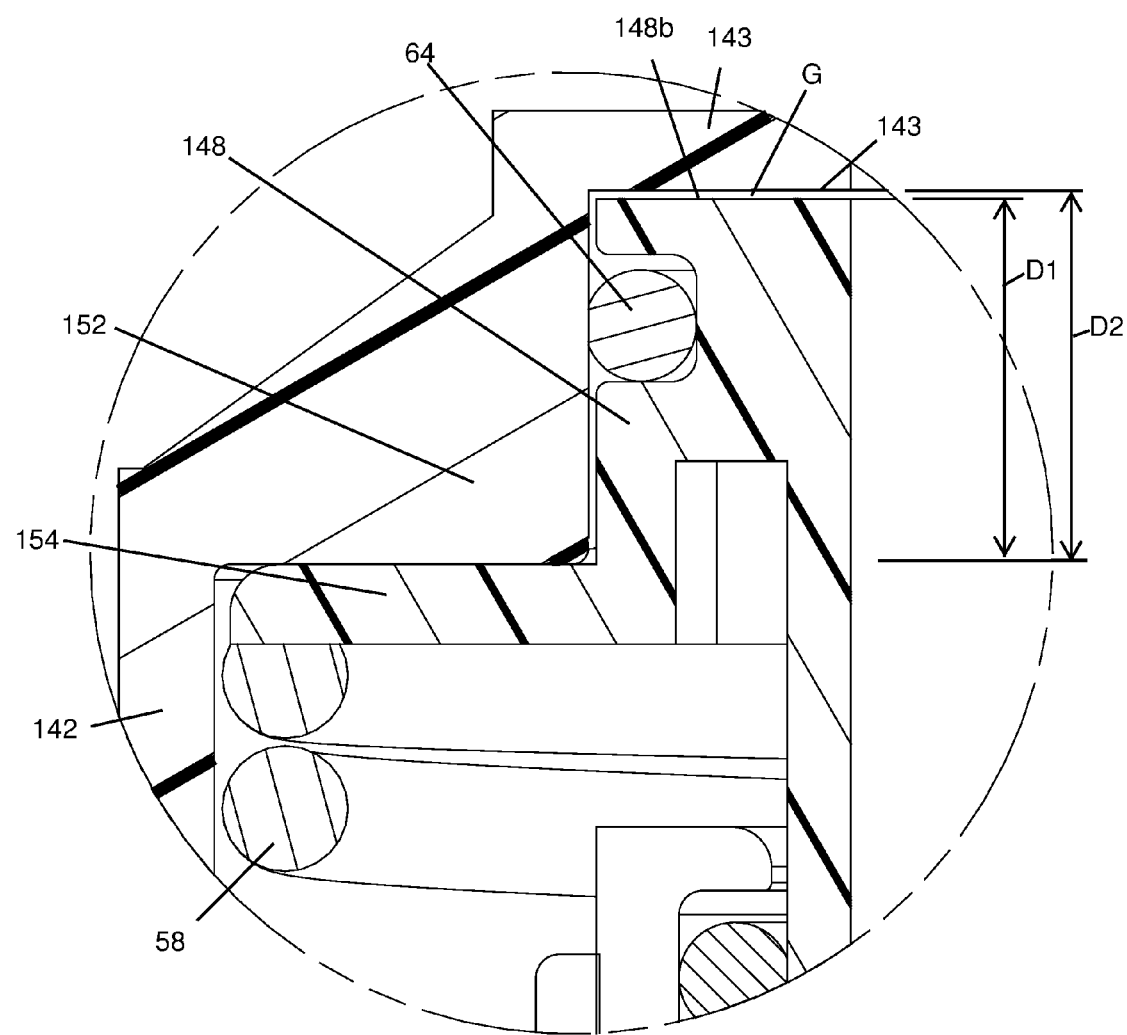
FIG. 11A is a close-up view of a portion of the pressure regulator of FIG. 11.

As illustrated in FIG. 11A, a flange 154 or other structural component of the valve body 148 can abut a shoulder 152 or other portion of the regulator housing 142 when the pressure regulator 140 is in an opened position. The distance D1 (e.g., parallel to a movement path of the valve body 148) between the flange 154 and a downstream end 148b of the valve body 148 can be less than a distance D2 (e.g., as measured parallel to the movement path of the valve body 148) between an upstream (e.g., lower) surface of the shoulder 152 and the upper cap 143. The difference between the distances D1 and D2 can create a gap G between the downstream end 148b of the valve body 148 and the upper cap 143. The gap G can facilitate water access to the downstream end 148b even when the pressure regulator 140 is in a fully opened configuration. In some cases, the gap G helps to reduce the likelihood that the valve body 148 gets "stuck" in the opened position.

Figure 13:
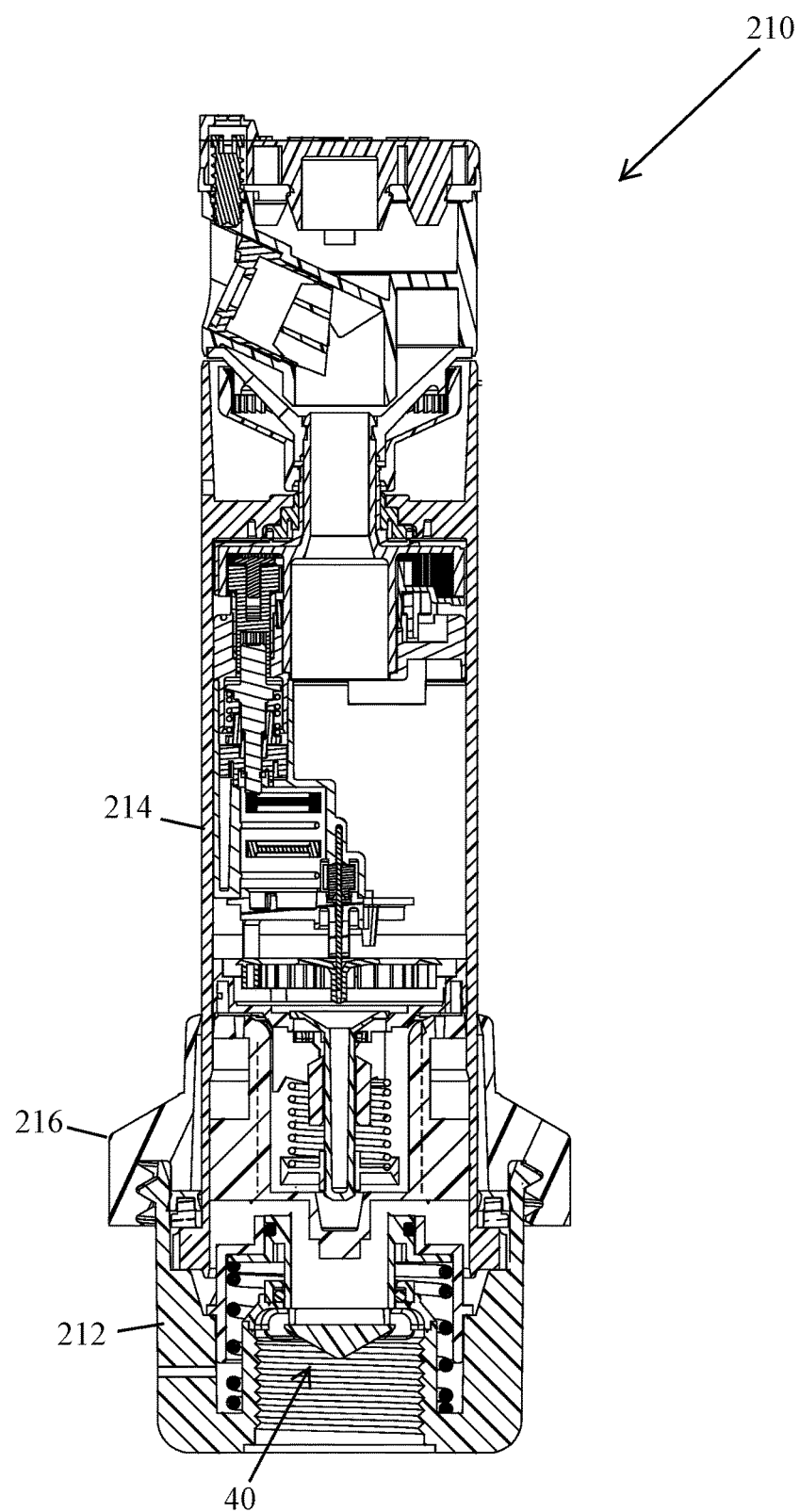
FIG. 13 is a vertical cross-sectional view of another embodiment of a sprinkler.

FIG. 13 illustrates an embodiment of a sprinkler 210 where the riser 214 is removably attached to the outer case 212 with cap 216. Sprinkler 210 is a fixed height sprinkler that does not extend when water pressure is supplied and does not retract when the water flow is turned off. Pressure regulator 40 is illustrated in FIG. 13, however the pressure regulator 140 can also be used in a fixed height sprinkler.

Many of the attributes of the pressure regulators described above with relation to sprinklers can be utilized in other irrigation components. For example, FIGS. 14 and 15 show two standalone pressure regulator assemblies that could be incorporated into an irrigation system. These pressure regulators assemblies can also be part of a valve assembly, controller, backflow preventer, sprinkler, etc. with the inlet or outlet of the device replaced with most, if not all of, the pressure regulator assemblies shown.

As illustrated in FIG. 14, the pressure regulator 40 can be installed in a pressure regulator assembly 80. The pressure regulator 40 can operate in a similar or identical manner when installed in the pressure regulator assembly 80 as explained above with respect to the sprinklers 10, 210. For example, the pressure regulator 40 can be configured to regulate pressure between an inlet 81 and an outlet of the pressure regulator assembly 80. The inlet 81 and/or outlet 82 can be configured to couple with a pressurized fluid (e.g., water, gas, oil, etc.) source or other fluid line. For example, the inlet 81 and/or outlet 82 can include external or internal threads configured to engage with threading on a fluid line. Other couplings, such as friction couplings or magnetic couplings can also be used.

The inlet 81 of the pressure regulator assembly 80 can have a longitudinal axis CL2 (e.g., an axis parallel to the coupling direction of the inlet 81). The outlet 82 can have a longitudinal axis CL3 (e.g., an axis parallel to the coupling direction of the outlet 82). As illustrated in FIG. 14, the longitudinal axis CL2 of the inlet 81 can be perpendicular to the longitudinal axis CL3 of the outlet 82. In some embodiments, the angle between the axes CL2, CL3 is greater than 20°, greater than 25°, greater than 30°, greater than 45°, greater than 60°, greater than 100°, greater than 120° greater than 135°, or any value there between.

The inlet 81 can be formed on an assembly inlet portion 83. In some embodiments, the assembly inlet portion 83 can include an inner tubular body 84. The inner tubular body 84 can be similar in shape and/or size to the inlet 13 of the outer case 12 disclosed above. In some embodiments, the inner tubular body 84 forms the inlet 81 of the pressure regulator assembly 80. The assembly inlet portion 83 can include an outer tubular body 85. The outer tubular body 85 can have an inner diameter greater than an outer diameter of the inner tubular body 84. In some embodiments, the outer tubular body 85 overlaps the inner tubular body 84 in a direction parallel to the longitudinal axis CL2 of the inlet 81 and/or of the inner tubular body 84. The outer tubular body 85 can be connected to the inner tubular body 84 via an annular wall 86 or other structure. In some embodiments, the inner tubular body 84, the outer tubular body 85, and the annular wall 86 are formed as a monolithic part (e.g., co-molded, injection molded, or otherwise formed as a single part). A space between the inner tubular body 84 and the outer tubular body 85 can form the chamber 44 in which the spring 58 or other biasing structure is housed. In some embodiments, the chamber 44 is vented to ambient via a vent hole 62 in the annular wall 86 or other venting structure.

In some embodiments, the outer tubular body 85 is configured to couple (e.g., releasably or fixedly) with an assembly outlet body 88. For example, threads on the outer diameter of the outer tubular body 85 can be coupled with female threading on an inlet coupling end 90 of the assembly outlet body 88. In some embodiments, the chamber 44 may be vented through the threaded engagement of the outer tubular body 85 with the inlet coupling end 90. Other coupling methods (e.g., friction fitting) may be used to couple the assembly inlet portion 83 with the assembly outlet body 88. The outlet 82 of the pressure regulator assembly 80 can be formed in the assembly outlet body 88. For example, the outlet 82 can be formed on an end of the assembly outlet body 88 opposite the inlet coupling end 90. The assembly outlet body 88 can have a generally tubular shape with an inner wall 92. A shoulder 94 or other valve stop structure can be formed on the inner wall 92 of the assembly outlet body 88. The valve stop structure can be configured to limit the distance to which the valve body 48 can move away from the valve seat 46. For example, the shoulder 94 can limit the movement of the valve body 48 away from the valve seat 46 when the flange 54 of the valve body 48 contacts the shoulder 94.

FIG. 15 illustrates an embodiments of a pressure regulator assembly 80' that is the same as or similar to the pressure regulator assembly 80 in many respects. For example, the assembly inlet portion 83 of the pressure regulator assembly 80' can be similar to or identical to the assembly inlet portion 83 of pressure regulator assembly 80. As illustrated, the longitudinal axis CL3' of the outlet 82' of the pressure regulator assembly 80' can be parallel to the longitudinal axis CL2 of the inlet 81.

As illustrated and described above, the pressure regulator assemblies 80, 80' can be designed to utilize the space surrounding and/or in-line with the inlet 81. For example, the spring 58 or some other component (e.g., O-rings) of the pressure regulator can be positioned in the space between a wall forming the inlet and an outer wall of the pressure regulator assembly. As illustrated in FIGS. 14 and 15, the space surrounding the inlet 81 can comprise the space between the inner tubular member 84 and the outer tubular member 85. The space can have a generally annular shape or some other shape.

In some embodiments, one or more of the valve body 48 and the valve seat 46 of the pressure regulator 40 can be positioned at least partially within the inlet 81. The inlet 81 can be a female threaded inlet. One or more of the valve body 48 and the valve seat 46 can be positioned at least partially within the threaded portion of the inlet. The valve seat 46 and valve body 48 can be sized and/or shaped to fit within a male threaded portion mated with the inlet 81.

Though the description of ways to incorporate a pressure regulator into a pressure regulator assembly herein focus on the relationship between the pressure regulator and the inlet to the pressure regulator assembly, it will be understood that a pressure regulator can be similarly positioned with respect to an outlet for a pressure regulator assembly or other fluid transfer component. For example, the pressure regulator 40 of FIGS. 14 and 15 may be positioned in proximity to the outlet 82 of the pressure regulator assemblies 80, 80'.

In some embodiments, a pressure regulator assembly can include an assembly inlet portion. The assembly inlet portion can include an inner tubular body having a longitudinal axis, an inner diameter, an outer diameter, an inlet end, and an outlet end. In some embodiments, the assembly outlet portion includes an outer tubular body. The outer tubular body can be collinear with and spaced radially from the inner tubular body with respect to the longitudinal axis of the inner tubular body. In some embodiments, the outer tubular body has an outer diameter and an inner diameter greater than the outer diameter of the inner tubular body. The outer tubular member can include a base end positioned between the inlet end and the outlet end of the inner tubular body. In some embodiments, the outer tubular member includes an outlet coupling end. The assembly inlet portion can include an annular wall between the inner tubular body and the outer tubular body and connecting the inner tubular body to the outer tubular body.

In some embodiments, the pressure regulator assembly includes a tubular assembly outlet body. The tubular outlet assembly can have an inlet coupling end. The inlet coupling end can be configured to couple with the outlet coupling end of the outer tubular body of the assembly inlet portion. In some embodiments, the tubular assembly outlet body has an outlet end. The tubular assembly outlet body can include an inner wall extending between the inlet end and the outlet end.

In some embodiments, the pressure regulator assembly includes a pressure regulator. The pressure regulator can include a valve seat. The valve seat can be positioned radially within the inner tubular body with respect to the longitudinal axis of the inner tubular body. In some embodiments, the pressure regulator includes a valve body. The valve body can be moveable with respect to the valve seat in response to pressure changes within the pressure regulator assembly between the outlet end of the inner tubular body and the outlet end of the tubular assembly outlet body. In some cases, the pressure regulator includes a biasing structure having a first end and a second end. The first end of the biasing structure can be positioned between the inner tubular body and the outer tubular body of the assembly inlet portion. In some embodiments, the second end of the biasing structure is in contact with the valve body. The biasing structure can be configured to bias the valve body away from the valve seat. In some embodiments, movement of the valve body toward the valve seat reduces the flow of fluid through the inlet end of the inner tubular body into the pressure regulator assembly. In some embodiments, movement of the valve body away from the valve seat increases the flow of fluid through the inlet end of the inner tubular body into the pressure regulator assembly.

According to some variants, the pressure regulator assembly can include a first seal. The first seal can be positioned between the valve body and the inner wall of the tubular assembly outlet body. In some embodiments, the first seal fluidly isolates an interior of the tubular assembly outlet body from a space between inner tubular body and the outer tubular body.

In some cases, the pressure regulator assembly includes a second seal. The second seal can be positioned between the valve body and an interior of the inner tubular body. In some embodiments, the second seal fluidly isolates the interior of the inner tubular body from a space between inner tubular body and the outer tubular body.

In some embodiments, the second end of the biasing structure is positioned between the first seal and the second seal. In some cases, the first end of the biasing structure is positioned outside of the space between the first seal and the second seal parallel to the longitudinal axis of the inner tubular member. The biasing structure can be a spring. In some embodiments, a longitudinal axis of the outlet end of the tubular assembly outlet body is parallel to the longitudinal axis of the inner tubular body.

Figure 16:
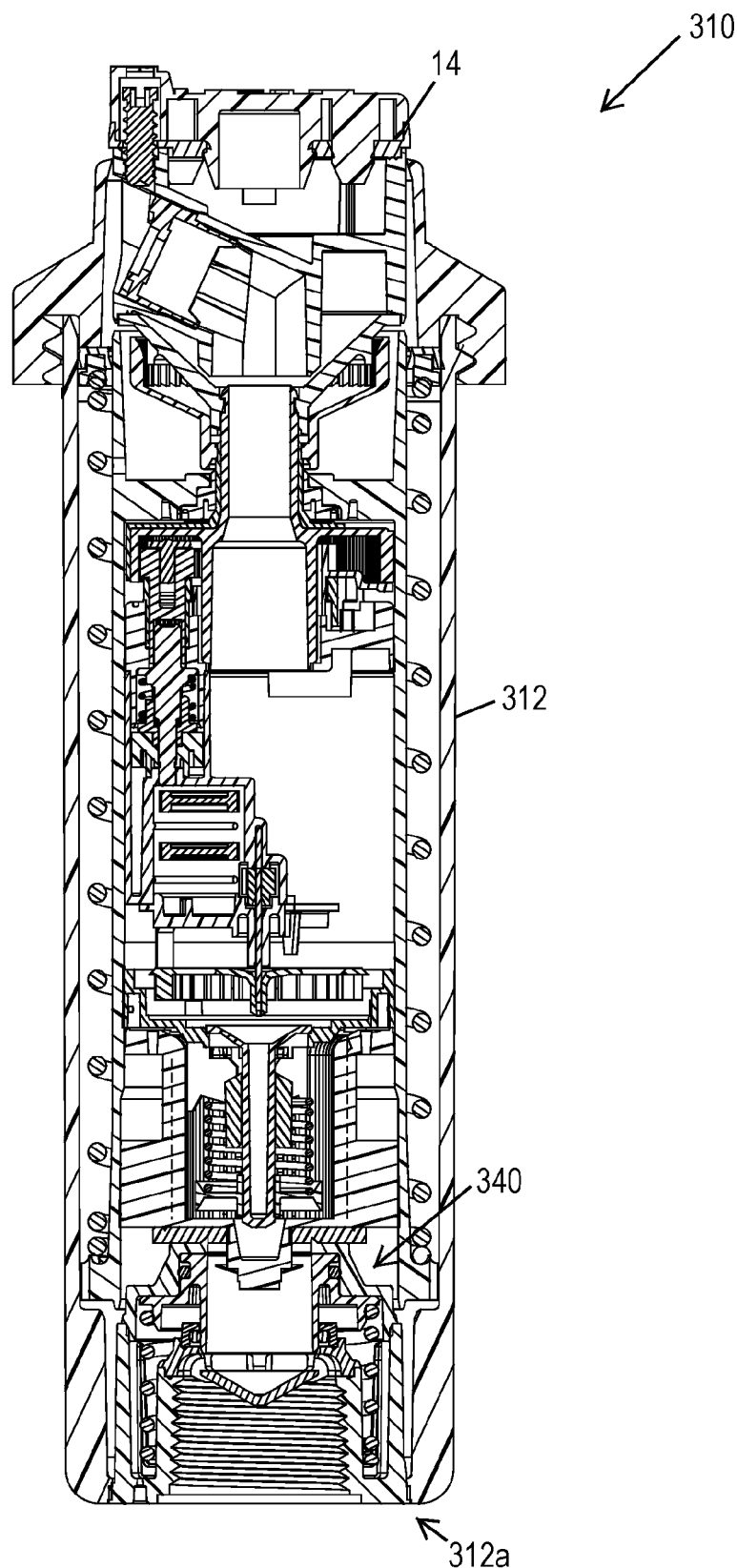
FIG. 16 is a vertical cross-sectional view of an embodiment of a sprinkler, wherein the riser is in a retracted position.
Figure 17:
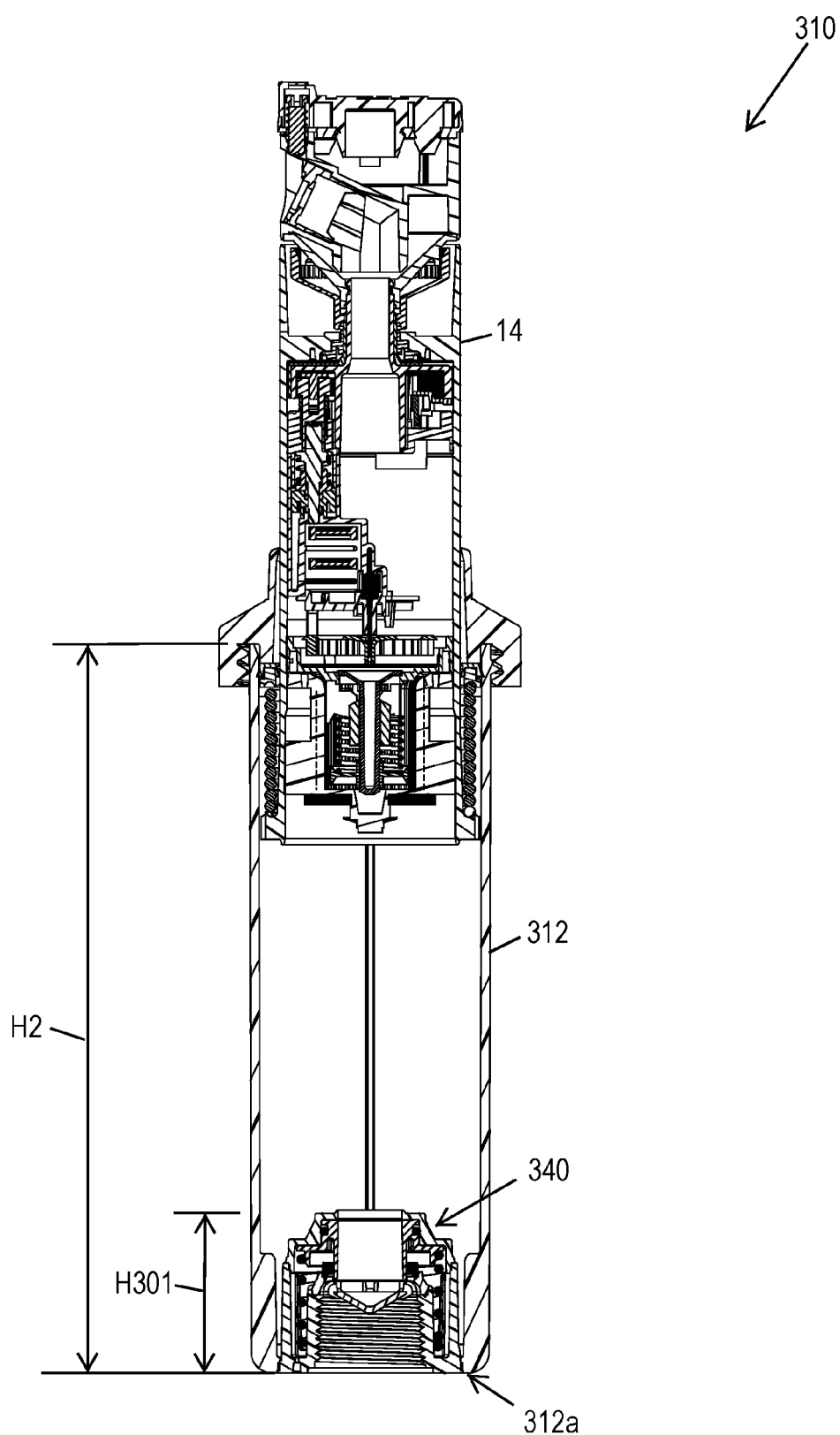
FIG. 17 is a vertical cross-sectional view of the sprinkler of FIG. 16, wherein the riser is in an extended position.
Figure 18:
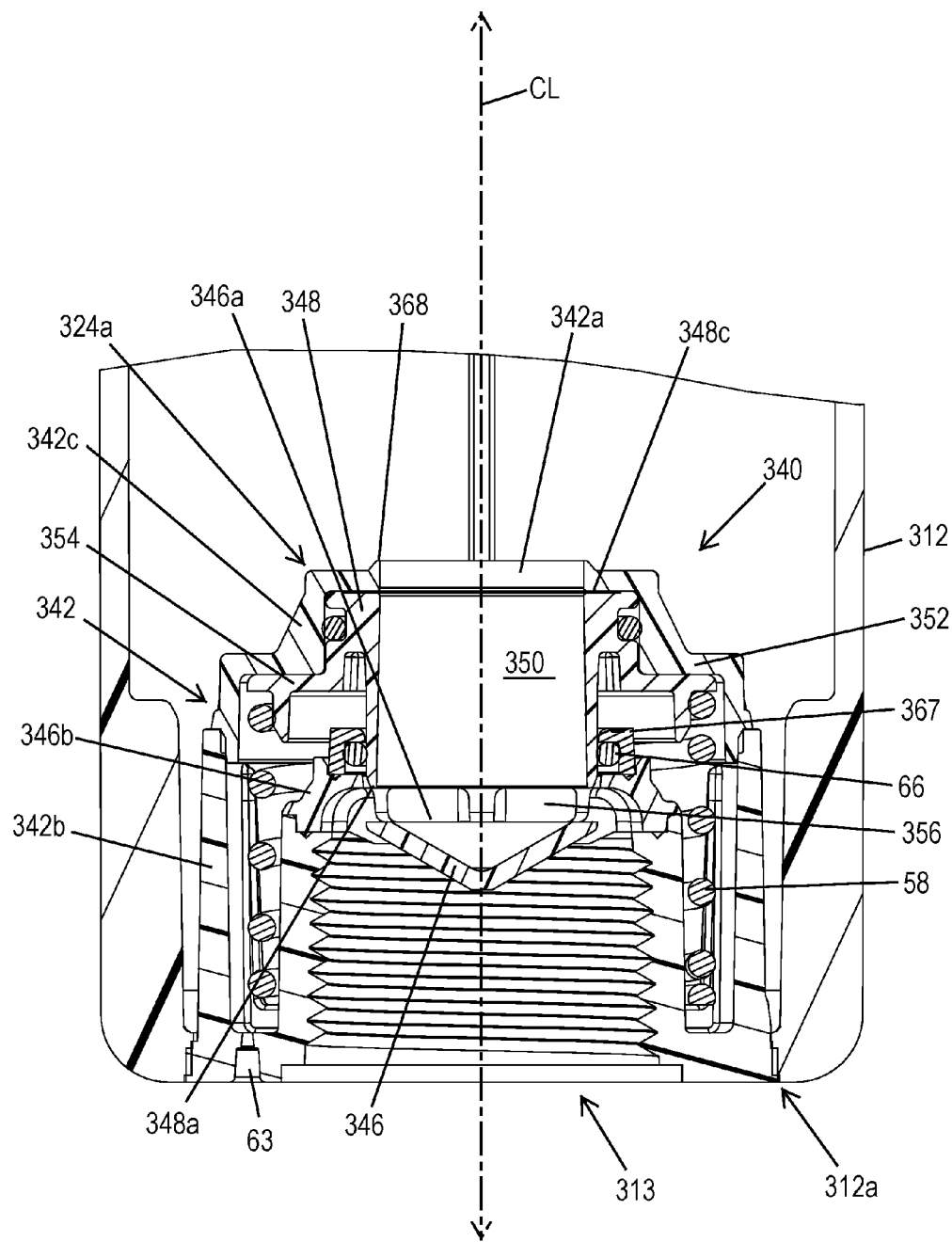
FIG. 18 is a detail view of a pressure regulator in a first position from the view of the vertical cross-sectional view the sprinkler of FIG. 17.

Referring to FIGS. 16-24, the sprinkler 310 can include one or more pressure regulators. For example, a pressure regulator 340 can be mounted partially or entirely within the outer case 312. As illustrated in FIGS. 16-18, the pressure regulator 340 may be mounted to the outer case 312. As also illustrated, the pressure regulator 340 can define an inlet of and to the outer case, though the pressure regulator can also be in other locations. In some embodiments, the pressure regulator 340 maintains a substantially constant water pressure at one or more points within riser 14 and/or within the outer case 312 during operation of the sprinkler 310. The pressure regulator 340 can be configured to help provide a constant or substantially constant outlet pressure over a wide range of inlet pressures. Regulating pressure of water in the sprinkler 310 can provide for more even watering during an irrigation cycle. In some embodiments, the pressure regulator 340 can serve as a check valve for the sprinkler 310 to inhibit or prevent low pressure water from passing through an outlet of the sprinkler 310 when the riser 14 is in a retracted position.

In some embodiments, the pressure regulator 340 can be positioned within an opening 312a in the outer case 312. In some embodiments, the pressure regulator 340 may be permanently adhered to the outer case 340 by solvent bonding, spin welding, ultra-sonic welding, or any other suitable means. The pressure regulator 340 can also be mechanically connected to the outer case, such as with an interference fit, snap fit, fastener, etc.

The pressure regulator 340 can include a valve body moveable with respect to a regulator seat. The relationship between the valve body and the regulator seat can determine the amount of fluid flow through the pressure regulator which can vary depending on the pressure of fluid flowing therethrough. Certain of the illustrated features of the pressure regulator 340 will now be described, though they may not be part of all embodiments.

In some embodiments, the regulator 340 may include an inlet 313. The inlet 313 can include threads, grooves, bayonet structure, and/or other mating structure configured to facilitate fluid connection between the inlet 313 of the regulator 340 and some portion of an irrigation system (e.g., a fluid line). Including an inlet 313 configured to connect to some other component of an irrigation system can allow the pressure regulator 340 to utilize unused space within the outer case 312, while limiting the change in size of the outer sprinkler itself as compared to a sprinkler without a pressure regulator. Thus, for example, the pressure regulator 340 can provide the inlet to the outer case, or in other words, it can provide the interface between the sprinkler and the pipes of an irrigation system.

The pressure regulator 340 can have a height H301 (FIG. 17) substantially parallel to the centerline CL of the riser 314. The height H301 of the pressure regulator 340 can be substantially smaller than the height H2 of the outer case 312. For example, the height H301 of the pressure regulator 340 can be greater than or equal to about 10% of the height H2 and/or less than or equal to about 40% of the height H2 of the outer case 312. In some embodiment, the height H301 of the pressure regulator 340 is approximately 22% of the height of the outer case 312. Many variations are possible. In some embodiments, use of a sprinkler 310 having a pressure regulator 340 with a height H301 substantially smaller than the height H302 of the case can reduce the cost of installing the sprinkler 310. For example, the irrigation lines connected to the sprinkler 310 may be positioned at a shallower location underground than irrigation lines connected to sprinklers having external pressure regulators.

Figure 19:
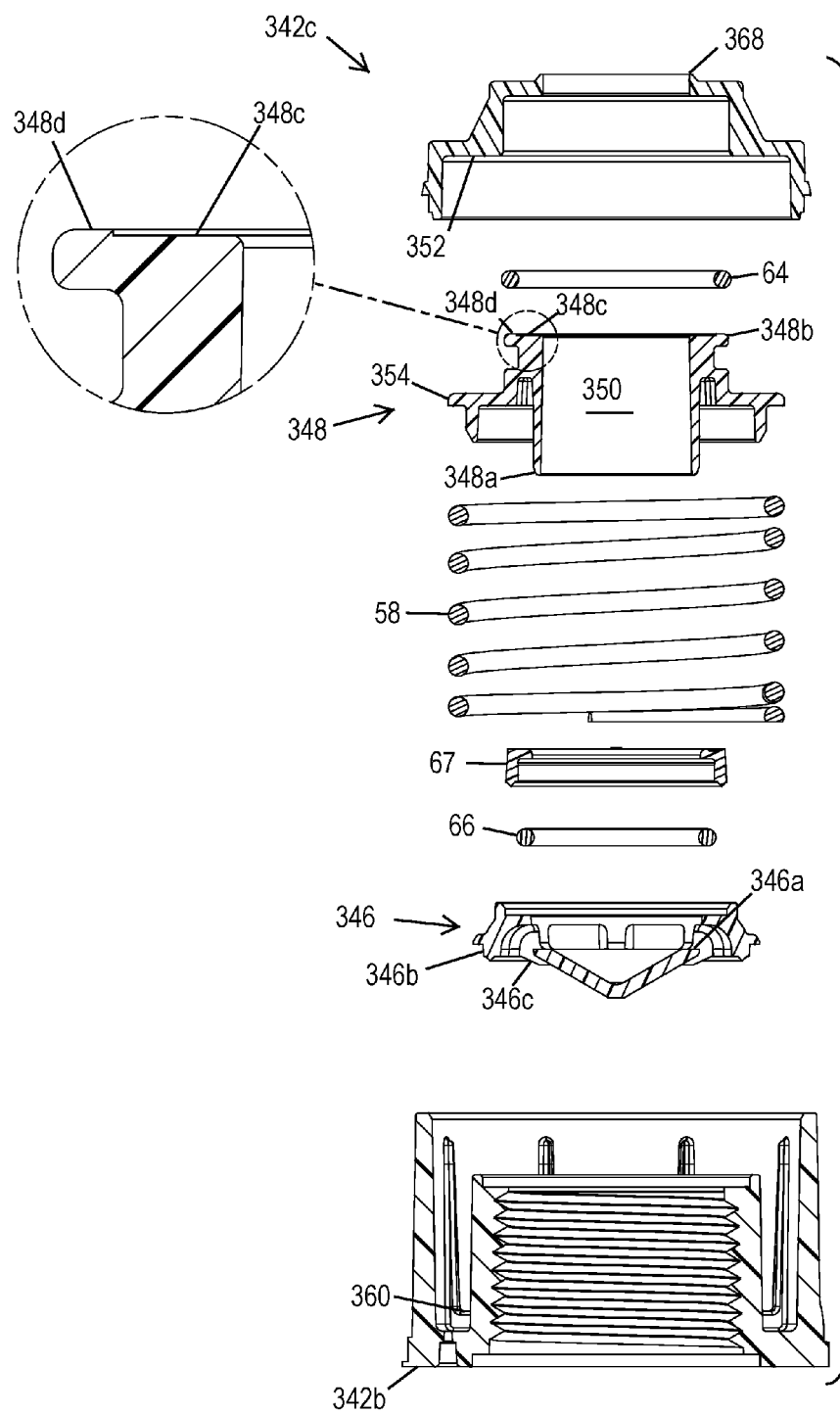
FIG. 19 is an exploded vertical cross-sectional view of the pressure regulator of FIG. 16.

The pressure regulator can include a regulator housing 342 (FIG. 18). A valve seat 346 can be positioned within the regulator housing 342. In some embodiments, as illustrated in FIGS. 18 and 19) the housing 342 can include a first (e.g. upstream) housing portion 342b connected to a second (e.g., downstream) housing portion 342c. In some embodiments, the two portions 342c and 342b may be permanently bonded together to form one unit. In some embodiments, the two portions 342b, 342c are removably connected to each other (e.g., via threading, detents, clips, or other releasable connection structure) The pressure regulator 340 can include a valve body 348 configured to move with respect to the regulator housing 342 and/or with respect to the valve seat 346.

The regulator housing 342 can be fixedly attached to the outer case 312. Attaching the pressure regulator 340 to the outer case 312 advantageously reduces the weight of the riser 14 as compared to a sprinkler wherein the pressure regulator is connected to the riser. Reducing the weight of the riser 14 can reduce the likelihood of wear and/or failure of components of the sprinkler 310 in response to impacts experienced in a pop-up sprinkler between the extended and retracted positions.

The regulator housing 342 may be part of or attached to the outer case 312 via welding, adhesives, threaded engagement, co-molding, fastener, and/or by any other attachment process or structure. The regulator housing 342 can include a regulator outlet 342a through which water may flow. In some embodiments, the regulator housing 342 surrounds at least a portion of the regulator inlet 313. Positioning the regulator housing 342 and/or other pressure regulator components surrounding and/or coaxial with the regulator inlet 313 can utilize space surrounding the regulator inlet 313 that may otherwise remain unused. In some embodiments, positioning the regulator housing 342 at least partially surrounding the regulator inlet 313 can reduce the extent to which the pressure regulator 340 extends into the outer case 312. In some embodiments, the inlet 313 (e.g., threaded inlet) maybe formed as a part of the regulator body 342.

The valve seat 346 may, in some embodiments, be attached to the regulator housing 342. In some embodiments, the valve seat 346 forms a monolithic part with the regulator housing 342. As illustrated, the valve seat 346 can be positioned within the interior of the housing 342 and/or the interior of the inlet 313. In some embodiments, the valve seat 346 is positioned in a fluid path between the regulator inlet 313 and the regulator outlet 342a. For example, the valve seat 346 can include a seating surface 346a. The seating surface 346a can be positioned adjacent or within the inlet 313. The valve seat 346 can include a seat collar 346b. The seat collar 346b can have an annular shape and can be attached to the regulator case 342 (e.g., at or near the inlet 313). The seating surface 346a can be connected to the seat collar 346b via one or more ribs 346c (FIG. 19). The one or more ribs 346c may extend radially (e.g., with respect to the centerline CL) between the seating surface 346a and the seat collar 346b.

Figure 20:
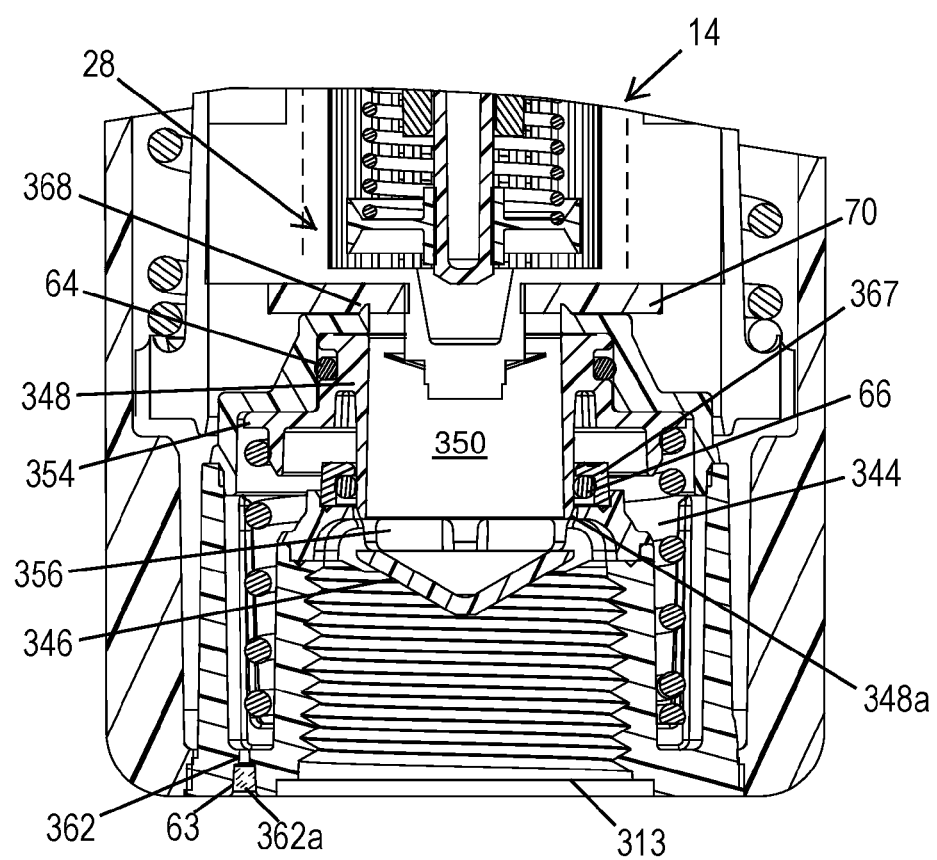
FIG. 20 is a detail view of a pressure regulator in a first position from the view of the vertical cross-sectional view the sprinkler of FIG. 16.

As illustrated in FIGS. 18-20, the valve body 348 may be mounted at least partially within the regulator housing 342. In some embodiments, the valve body 348 is positioned downstream of the valve seat 346 and/or between the valve seat 346 and the riser 14. The valve body 348 can be configured to move (e.g., linearly reciprocate) with respect to the valve seat 346 and/or with respect to the regulator housing 342. In some embodiments, the valve body 348 moves in response to changes in water pressure within the riser 14 and/or within the outer case 312. In some embodiments, the valve body 348 has a generally tubular (e.g., cylindrical) shape. The valve body 348 can define a valve channel 350 through which water may flow. As explained in more detail below, movement of the valve body 348 within the pressure regulator 340 can regulate the water pressure within the riser 14 and/or within the outer case 312 of the sprinkler 310.

The valve body 348 can be configured to translate in a first direction away from the valve seat 346 and in a second direction toward the valve seat 346. As shown, the valve body 348 can be biased to an open position. In the open position the valve body 348 can be forced into contact with some portion of the regulator housing 342. In some embodiments, the regulator housing 342, or some portion thereof, inhibits or prevents movement of the valve body 348 in the first direction to limit the extent to which the valve body 348 can move in the first direction. For example, in some embodiments, the regulator housing 342 has a stepped diameter that provides a shoulder at 352, as illustrated in FIG. 18. The shoulder 352 can interfere with a flange 354 or other structure on the valve body 348 when the valve body 48 moves in the first direction. Interference between the flange 354 and the shoulder 352 can limit movement of the valve body 348 in the first direction to a first (e.g., opened) position. In some embodiments, movement of the valve body 348 in the second direction is limited by interference between the valve body 348 and the valve seat 346. For example, the seating surface 346a of the valve seat 346 can have a diameter that is greater than or equal to an inner diameter of a first end 348a of the valve body 348. Interference between the valve body 348 and the valve seat 346 can limit movement of the valve body 348 in the second direction to a second (e.g., closed) position. In some embodiments, movement of the valve body 348 in the second direction is limited by interference between the valve body 348 and a portion (e.g., a shoulder or flange) of the regulator housing 342 and/or some other structure of the pressure regulator 340. In some embodiments, the valve body 348 is prevented from contacting the valve seat 346 via interference by some portion of the housing 342. In some such embodiments, the pressure regulator 340 can be configured to remain in an at least partially open position over the full range of operation of the sprinkler 310.

As illustrated in FIG. 18, the pressure regulator 340 can have a valve inlet 356. In some embodiments, the valve inlet 356 is positioned at or near the inlet 313 of the regulator housing 342. The pressure regulator 340 can be configured to vary the size of the valve inlet 356 in response to changes in water pressure within the riser 314 and/or within the outer case 312. For example, increasing the size of the valve inlet 356 can permit an increased amount of water to enter the outer case 312. Increased water flow into the outer case 312 can increase the water pressure within the outer case 312 and/or within the riser 314. On the other hand, decreasing the size of the valve inlet 356 can restrict or reduce the amount of water entering the outer case 312. Reducing the amount of water entering the outer case 312 can reduce the water pressure within the outer case 312 and/or within the riser 14.

As illustrated in FIGS. 18 and 20, the valve inlet 356 can be defined or bounded by the valve seat 346 (e.g., the seating surface 46a) and the first end 348a of the valve body 348. Movement of the valve body 348 in the first direction, away from the valve seat 346, can increase the size of the valve inlet 356. Movement of the valve body 348 in the second direction, toward the valve seat 346, can decrease the size of the valve inlet 356.

In some embodiments, the valve body 348 is biased to the first, open position by a biasing structure. For example, a spring 58 (e.g., a coil spring) or other biasing structure can exert force on some portion of the valve body 348 in the first direction. In some embodiments, one end of the spring 58 is braced against a portion of the regulator housing 342 (e.g., within a spring seat 360 formed between the case inlet 313 and an outer wall of the regulator housing 342) or other fixed structure and the other end of the spring 58 is braced against a portion (e.g., the flange 354) of the valve body 348.

In the illustrated embodiment, the spring 58 is positioned coaxially with and surrounding at least a portion of the tubular body of the valve body 348. Preferably, the spring 58 surrounds at least a portion of the regulator inlet 313. As illustrated, the pressure regulator 340 can have a compact arrangement wherein the valve body 348, spring 58, and/or regulator housing 342 are coaxial and overlap each other in a direction substantially parallel to the centerline CL of the riser 314.

In some embodiments, at least a portion of the pressure regulator 340 can be vented to atmosphere. For example, a vent 362 (FIG. 20) can be positioned in and/or through a wall of the pressure regulator 340 in communication with the portion of the pressure regulator in which the spring 58 is housed. In this way air pressure build-up around the valve member 348 can be prevented or reduced. As illustrated in FIG. 20, the flange 354 is positioned in a chamber 344 of the housing interior which is maintained at ambient pressure via a vent 362 between the chamber 344 and the exterior of the housing 342. The vent 362 can be positioned at the first end 342b of the regulator housing 342. In some embodiments, the vent 362 extends downward through the first end 342b of the regulator housing 342.

In some embodiments, a filter 63 can positioned in the vent 362 (e.g., in filter chamber 362a as can be seen in FIG. 20). The filter 63 can inhibit or prevent debris from entering the pressure regulator 340. The vent 362 can communicate directly with the soil surrounding the sprinkler 310 when it is buried in the ground. The air displaced by the pressure regulator 340 can be absorbed in the soil and can ultimately communicate with atmospheric pressure. In some cases, the sprinkler 310 is mounted above the soil and the vent 362 communicates directly to the air outside the sprinkler 310.

One or more seals on the valve body 348, on the valve seat 346, and/or on the regulator housing 342 can fluidly isolate the chamber 344 from the interior of the sprinkler 310. For example, a first O-ring 64 can be positioned surrounding a radially-outward portion of the valve body 348 at or near the second (e.g., downstream) end 348b of the valve body 348. The first O-ring 64 can form a seal between an outer surface of the valve body 48 and an inner surface of the regulator housing 342 at or near the regulator outlet 342a. In some embodiments, the first O-ring 64 is fixed to the regulator housing 342 in a direction substantially parallel to the direction of movement of the valve body 348. In some embodiments, the first O-ring 64 is fixed to the valve body 348 in a direction substantially parallel to the direction of movement of the valve body 348. A second O-ring 66 can be positioned around an outer portion of the valve body 348 at or near the first end 348a of the valve body 348. The second O-ring 66 can form a seal between the valve body 348 and a portion of the valve seat 346 (e.g., the seat collar 346b). In some embodiments, the second O-ring 66 can be fixed to a portion of the valve seat 346 (e.g., via an O-ring retainer 367 attached to the seat collar 346b or to some other portion of the valve seat 346) in a direction substantially parallel to the direction of movement of the valve body 348. In some embodiments, the second O-ring 66 can be fixed to the valve body 348 in a direction substantially parallel to the direction of movement of the valve body 348. As illustrated, the spring 58 may overlap second O-ring 66 and/or the valve seat 346. Overlap of the spring 58 with the second O-ring and/or valve seat 46 can reduce the overall height of the pressure regulator 40.

Introduction of water into the sprinkler 310 via the regulator inlet 313 can increase the water pressure within the sprinkler 310 (e.g., within the riser 14 and/or within the outer case 312). As illustrated in FIG. 19, an engagement surface 348b, shown here as a second (e.g., downstream or upper) end 348b of the valve body 348 can have a greater radial thickness and/or greater cross-sectional area than the first end 348a of the valve body 348. In some such embodiments, water pressure within the sprinkler 310 exerts a greater force on the engagement surface 348b of the valve body 348 than on other parts of the valve body 348, producing a net pressure force on the valve body 348 toward the valve seat 346. In some such embodiments, water pressure within the sprinkler 310 exerts a greater force on the second end 348b of the valve body 348 than on the first end 348a of the valve body 348, producing a net pressure force on the valve body 348 toward the valve seat 346. At relatively low water pressure the spring 58 biases the valve body 348 of the pressure regulator 340 in the first direction away from the valve seat 348 to a fully open configuration, as illustrated in FIG. 20, allowing maximum water flow. When the net pressure force on the valve body 348 exceeds the biasing force of the spring 58, the valve body 348 moves in the second direction, toward the valve seat 346. In some embodiments, the biasing force of the spring 58 increases as the valve body 348 moves toward the valve seat 346, as the spring force within the spring 58 increases as the spring 58 is compressed.

As explained above, movement of the valve body 348 toward valve seat 346 reduces the size of the valve inlet 356. Reducing the size of the valve inlet 356 can reduce the flow rate of water into the sprinkler 310, reducing the water pressure within the sprinkler 310, within the riser 14, and/or within the case 312. Reduction of water pressure within the sprinkler 310 can reduce the net pressure force on the valve body 348. When the net pressure force on the valve body 348 is reduced, the biasing force of the spring 58 can move the valve body 348 toward the first, open position. The net pressure force and biasing force of the spring 58 can move the valve body 348 back and forth between the first (e.g., open) position and second (e.g., closed) position to maintain a substantially constant water pressure in the riser 14, and/or within the outer case 312. The biasing force of the spring 58 can inhibit or prevent prolonged complete closure of the valve inlet 356. For example, complete closure of the valve inlet 356 can cause the water pressure in the sprinkler 310 to drop and cause the net pressure force on the valve body 348 to reduce. As explained above, reduction in the net pressure force on the valve body 348 can permit the biasing force of the spring 58 to move the valve body 348 in the first direction away from the valve seat 346, opening the valve inlet 356.

As illustrated in FIG. 19, in some embodiments, the engagement surface 348b includes a step. For example, a radially-inward portion 348c of the engagement surface 348b can be recessed (e.g., in a direction parallel to the centerline CL) with respect to the radially outward portion of the engagement surface 348b. In some embodiments, the radially-inward portion 348c of the engagement surface 348b is positioned closer to the second (e.g., upstream or lower) end 348a of the valve body 348 than the radially-outward portion 348d of the engagement surface 348b. In some embodiments, as illustrated in FIG. 18 the radially-inward portion 348c of the engagement surface 348b is spaced from the regulator housing 342 to maintain a gap into which water can be directed to contact the engagement surface 348b even when the valve body 348 is in a fully opened position. Maintaining such a gap can reduce the risk of the valve body 348 getting "stuck" in the opened position independent of water pressure within the sprinkler 310.

The pressure regulator 340 can be a fixed pressure regulator in that the components thereof can be configured and dimensioned to limit the water pressure at the entrance of the nozzle 18 to a predetermined desired water pressure. Achieving a predetermined water pressure at the entrance of the nozzle 18 may require that the strength of the spring 58 be carefully selected. A fixed pressure regulator is often specified by customers in large installations such as recreational parks, playing fields, apartment complexes and industrial parks.

Regulating the water pressure inside the sprinkler 310 can result in substantial water savings in a same or similar way as explained concerning Sprinkler 10.

Utilizing the space surrounding and/or in-line with the inlet 313 for the pressure regulator can provide a more compact sprinkler than if the pressure regulator were positioned elsewhere. For example, one or more components of the pressure regulator can be positioned between a wall forming the inlet 313 and a wall of the outer case 312. As shown in FIG. 18, the side wall of the outer case 312 and the wall forming the inlet 313 can be parallel or substantially parallel. The spring 58 is shown positioned in the space between these two walls, though other components including, but not limited to, O-rings and portions of the regulator housing 342 and the valve body 348 can also be positioned in this space. This space can be a ring-like (e.g., annular) space encircling the inlet 313, though it can also have other shapes. Thus, the spring 58 can be a helical spring positioned within a ring-like space encircling the inlet 313. In some embodiments, the spring 58 is positioned adjacent to the threaded portion of the inlet wall and the ring-like space encircling the inlet can also encircle the threaded portion of the inlet 313.

In some embodiments, one or more of the valve seat 346 and the valve body 348 can be positioned within the inlet 313. The inlet 313 can be a female threaded inlet and one or more of the valve seat 346 and the valve body 348 can be positioned within the threaded portion of the inlet 313. As shown, the valve seat 346 can be partially positioned within the threaded portion. The valve seat 346 and valve body 348 can be sized to fit within a male threaded pipe used to connect to the female threaded inlet 313. In some embodiments, the orientation of the valve body 348 and valve seat 346 can be reversed. In such embodiments, the valve body 348 may be positioned within the inlet 313 and may optionally be within the threaded portion of the inlet 313, while the valve seat 346 can be outside of or within the inlet 313.

In some embodiments, as illustrated in FIGS. 16 and 20, the pressure regulator 340 provides a riser seat 368 for the sprinkler 310. As best seen in FIG. 18, the riser seat 368 can extend from the second end 324a of the regulator 340. When water flow is removed from the inlet 313, the spring 18 can cause the riser 14 to retract into the outer case 312. As illustrated in FIG. 20, as the riser 14 retracts, the check valve 28, or some portion of the riser 14 can contact the riser seat 368. For example, an elastomeric seal 70 of the check valve 28 can come into contact with the riser seat 368 as the riser 14 transitions to its retracted position. The elastomeric seal 70 can compress slightly. In the fully retracted position, the elastomeric seal 70 can contact an upper surface of the regulator housing 342 (e.g., an upper surface of regulator outlet 342a).

Figure 21:
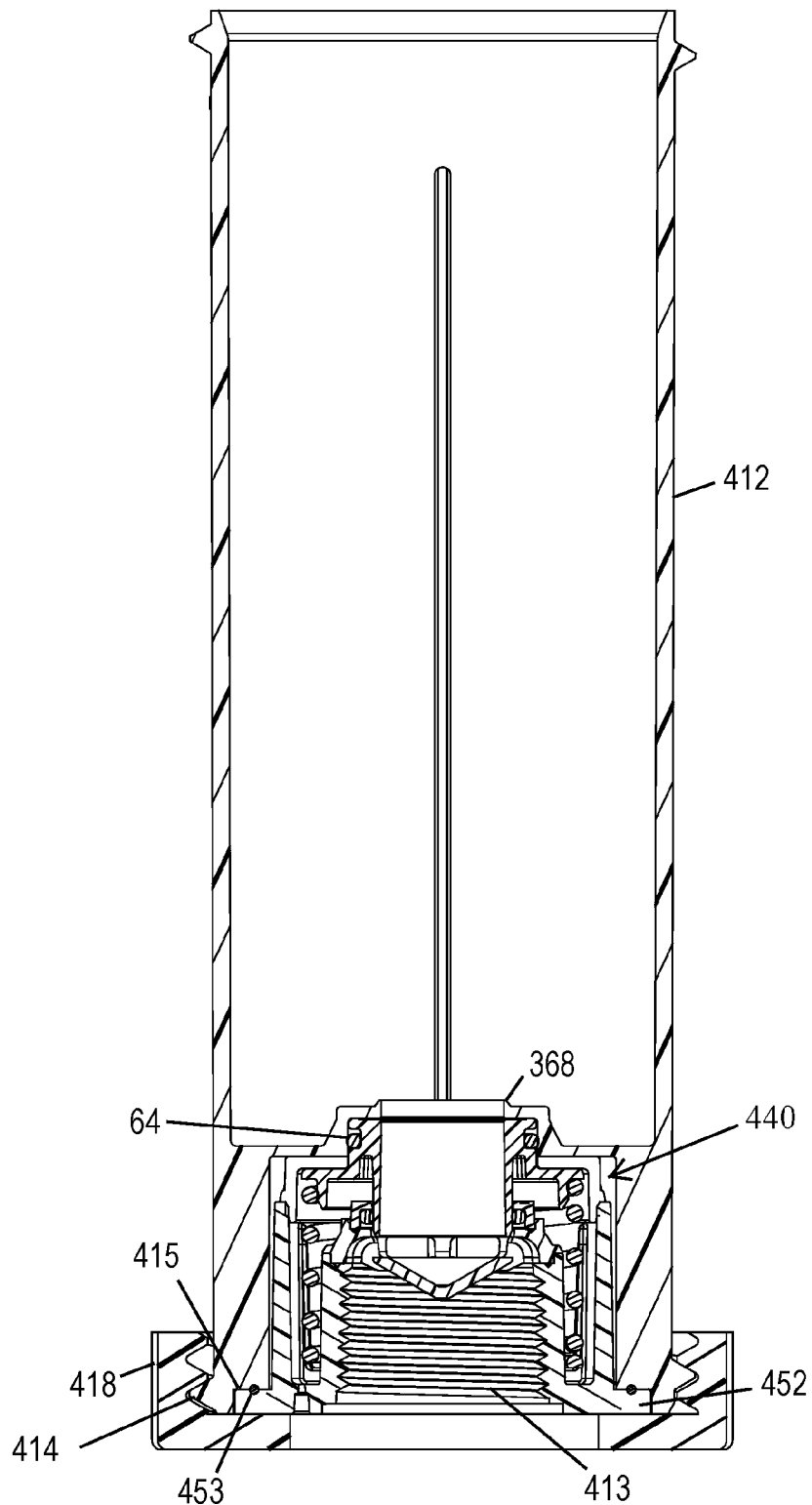
FIG. 21 is a section view of another embodiment of a sprinkler outer case assembly where the pressure regulator is removable from the outer case and the riser seat is formed in the outer case.
Figure 22:
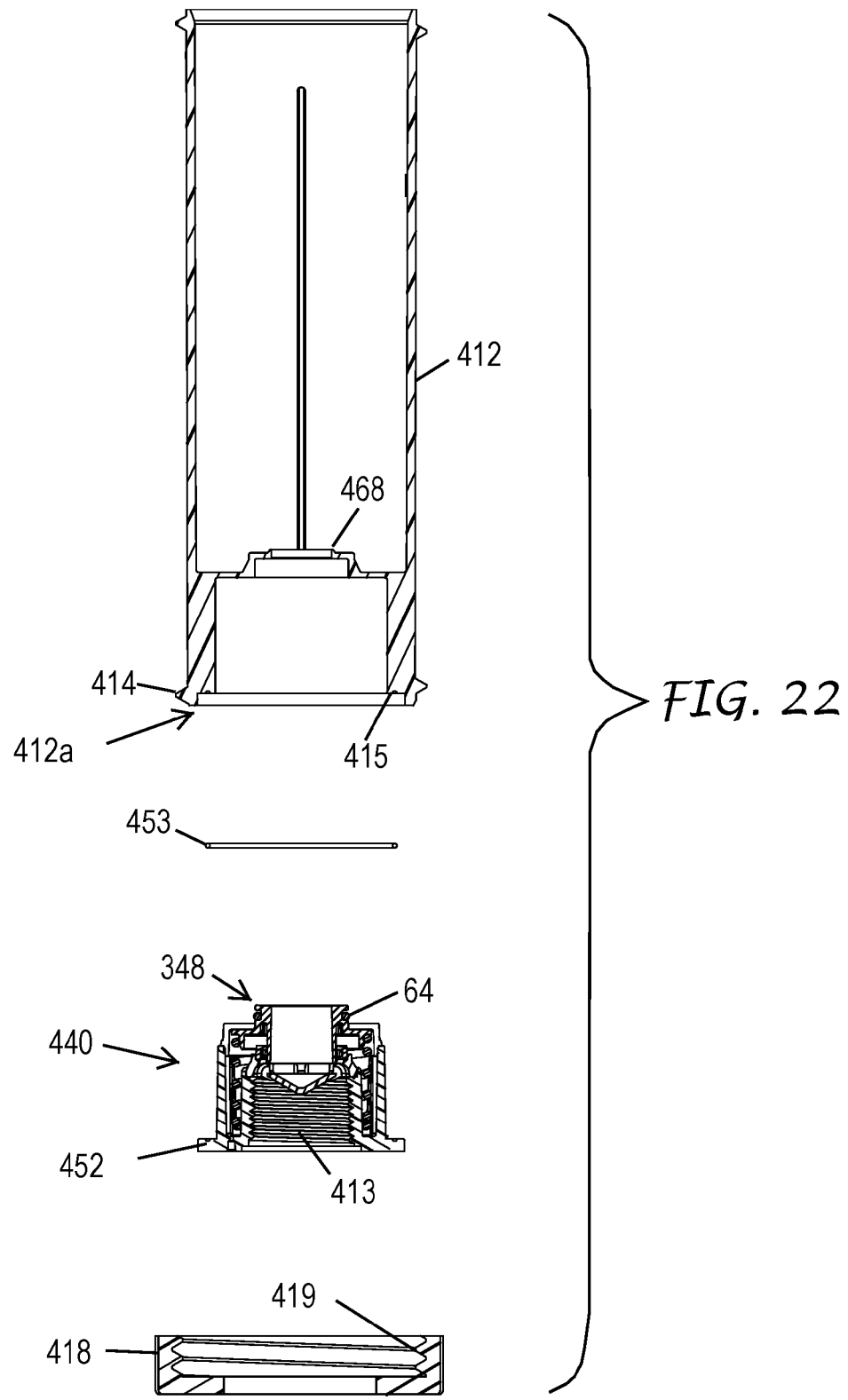
FIG. 22 is an exploded view of the outer case assembly of FIG. 21.

In some embodiments, as illustrated in FIGS. 21 and 22, a pressure regulator 440 that operates in a similar fashion to the regulator 340 may be removeably installed at the first end 412a of a sprinkler outer case 412. In some embodiments, a threaded portion 414 is formed near the first end of the outer case 412. In some embodiments, an O-ring 453 may be positioned between the flange 452 of the pressure regulator 440 and an inner surface 415 formed near the first end 412a. In some embodiments, an O-ring or other suitable seal may be positioned in any position between an outer surface of the pressure regulator 440 and an inner surface of the outer case 412 to inhibit or prevent pressurized water from escaping between the regulator 440 and the outer case 412. In some embodiments, provision may be made to prevent the regulator from turning inside the outer case 412. This allows a user to thread the inlet 413 on or off of a water supply pipe without the threaded inlet 413 rotating relative to the outer case 412. As example, the flange 452 may be round, or it may have one or more flats formed in its outer surface. One or more mating flat surfaces may be formed in the inner surface of the lower cavity 416 of the outer case 412. In some embodiments, a threaded portion 419 is formed on an inner surface of a retaining cap 418. The threaded portion 419 can be threaded onto the threaded portion 414 of the outer case 412. In some embodiments, the retaining cap 418 may hold the regulator 440 in the outer case 412. In some embodiments, the retaining cap 418 may be removed to allow a user to remove the regulator 440 from the outer case 412.

In some embodiments, outer case 412 includes a riser seat 468 to mate with the elastomeric seal 70 when the riser 14 is installed. The riser seat 468 may be molded in the case 412. In some embodiments, the riser seat 68 may be formed on a flange that is separate part that is then attached to the inner portion go the outer case 412 during assembly.

Figure 23:
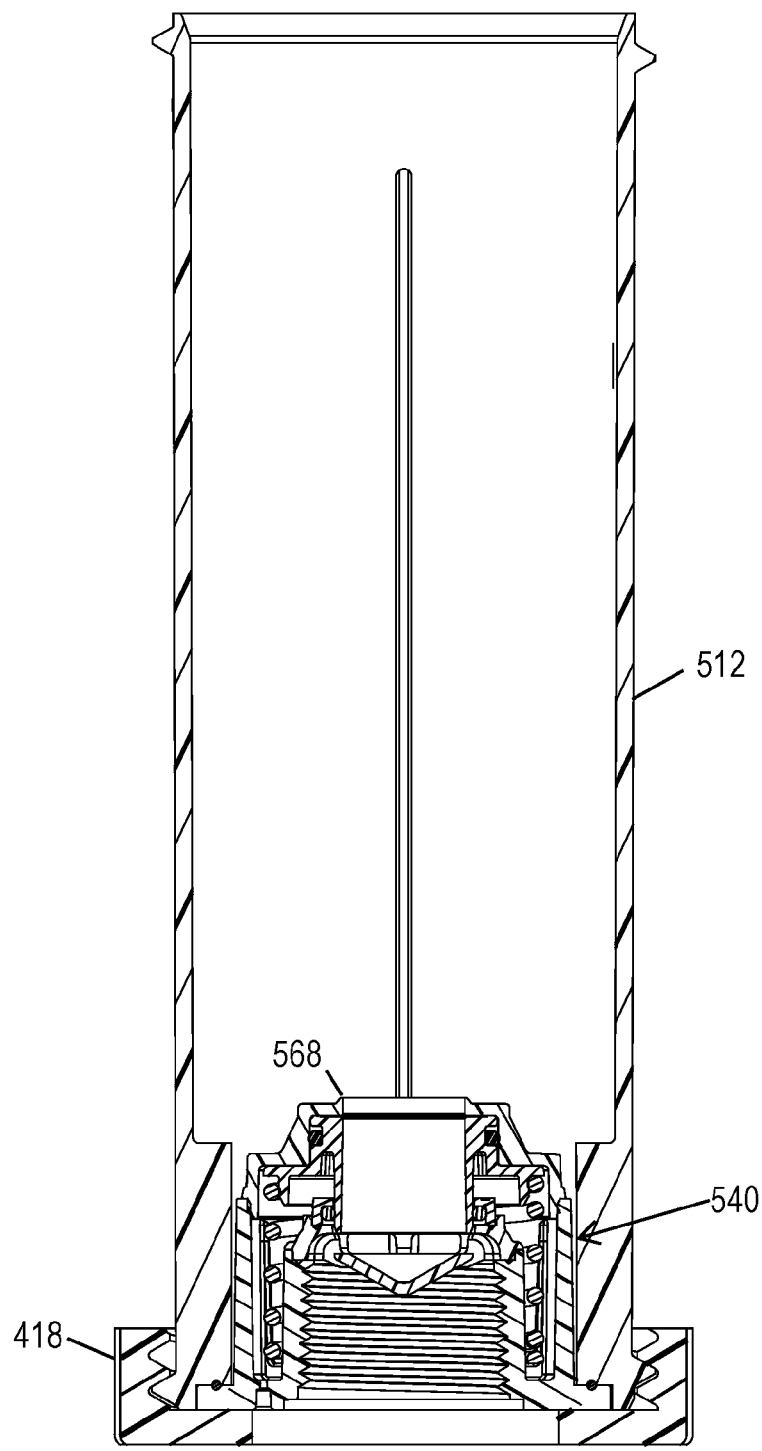
FIG. 23 is a section view of another embodiment of a sprinkler outer case assembly where the pressure regulator is removable from the outer case and the riser seat is formed on the pressure regulator.

In some embodiments, a removable pressure regulator 540 includes a riser seat 568 to mate with the elastomeric seal 70 when the riser 14 is installed. As best seen in FIGS. 23 and 24 the riser seat 568 can extend from the second end 542*a* of the regulator 540. In this embodiment, a riser seat 568 is not formed as part of the outer case 512 and can be removed for cleaning, or may be replace as a part of the replaceable regulator 540.

Each of the above described sprinklers include a pressure regulator that can reduce the inlet pressure and maintain a relatively stable pressure inside the outer case and/or at the riser inlet when a higher water pressure is present at the inlet.

For expository purposes, the term "horizontal" as used herein is defined as a plane parallel to the plane or surface of the floor of the area in which the system being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane. The terms "upstream" and "downstream" are defined with respect to flow of water into, through, and out of the various sprinkler assemblies described above. In some cases, the term "upstream" is used synonymously with the term "lower" and/or the term "downstream" is used synonymously with the term "upper."

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

While several embodiments of a rotor-type sprinkler have been disclosed with a built-in pressure regulator adjacent its inlet, it will be understood by those skilled in the disclosed sprinklers can be modified in both arrangement and detail. For example, instead of the staggered gear train reduction 24, the sprinkler 10 could incorporate a planetary gear train reduction. Other forms of reversing mechanism could be used such as a plate with tangential fluid ports and a port shifting mechanism, or a combination planetary gear reduction and reversing mechanism such as that disclosed in U.S. Pat. No. 7,677,469 of Michael L. Clark, the entire disclosure of which is hereby incorporated by reference. The sprinklers 10 and 310 could be a fixed spray type sprinkler with no gear reduction at all. One or more of the components of the sprinklers 10, 210 and 310 can be made of injection molded plastic parts, metal shafts, steel springs and/or seals made of a suitable elastomeric material. The pressure regulator 40, 140, 340, 440, 540 could be permanently attached or removably attached to the outer case 12. In some case, the pressure regulator 40, 140 340, 440, 540 is assembled as part of a pressure regulator assembly 80, 80', or 340. The a riser seat 68 may be formed of an elastomeric material and co-molded or otherwise attached to the valve body 48 thereby providing a check valve that will contact with a lower surface (e.g., a smooth lower surface) attached to the riser. Therefore the protection afforded the present disclosure should only be limited in accordance with a fair reading of the following claims.

In some cases, as described above, the inlet to the sprinkler can be included on or in the pressure regulator. In some cases, the pressure regulator is positioned adjacent to, around, inside of, outside of, and/or downstream of the inlet to the sprinkler. The inlet to the sprinkler can, in some cases, be formed as an integral part with one or both of the pressure regulator and the outer case.

What is claimed is:

1. An irrigation sprinkler comprising:
    an outer case having a case volume, a longitudinal axis, and having a first opening on a first end and a second opening on a second end;
    a riser positioned at least partially within the case volume and configured to extend through the second case opening having:
        a riser inlet end having a riser inlet;
        a riser outlet end;
        an outlet housing connected to the riser outlet end; and
        a riser outlet in the outlet housing; and
    a pressure regulator having an threaded inlet that can be coupled to a water supply, the threaded inlet comprising an upstream end, a downstream end, and an inlet wall extending between the upstream and downstream ends, the inlet wall having internal threads extending over a majority of a length of the wall as measured parallel to the longitudinal axis of the outer case;
    the pressure regulator fixedly mounted to the first opening of the outer case and positioned at least partially within the outer case and configured to regulate fluid pressure within the irrigation sprinkler as water enters the outer case to maintain a substantially constant pressure inside the outer case and the riser inlet, wherein the pressure regulator comprises a spring at least partially surrounding at least a portion of the inlet wall and overlapping at least a portion of the internal threads of the inlet wall in a direction parallel to the longitudinal axis of the outer case.

2. The irrigation sprinkler of claim 1, wherein the outlet housing is rotatably connected to the riser outlet end.

3. The irrigation sprinkler of claim 1, further comprising a turbine mounted in the riser and rotatable by water entering the riser inlet and a gear train reduction mounted in the riser and operably coupled with the turbine and with the outlet housing.

4. The irrigation sprinkler of claim 1, wherein at least a portion of the pressure regulator surrounds at least a portion of the inlet of the pressure regulator between the inlet of the pressure regulator and an outer wall of the outer case.

5. The irrigation sprinkler of claim 1, wherein the pressure regulator comprises a valve body and a regulator housing, the valve body configured to translate within the regulator housing in response to a fluid pressure within the outer case.

6. The irrigation sprinkler of claim 5, wherein the spring biases the valve body to an opened position.

7. The irrigation sprinkler of claim 6, wherein at least a portion of the spring is positioned radially outward from the inlet of the pressure regulator with respect to the longitudinal axis of the outer case.

8. The irrigation sprinkler of claim 1, wherein the pressure regulator defines a regulator volume that is vented to atmosphere via a vent port, the regulator volume fluidly isolated from the case volume.

9. The irrigation sprinkler of claim 8, wherein a filter is positioned within the vent port.

10. The irrigation sprinkler of claim 1, further comprising a check valve positioned between the pressure regulator and the riser inlet.

11. The irrigation sprinkler of claim 1, wherein the pressure regulator comprises a riser seat.

12. The irrigation sprinkler of claim 11, wherein the riser seat is fixedly connected to the outer case.

13. The irrigation sprinkler of claim 11, wherein the riser seat is moveable with respect to the outer case.

14. The irrigation sprinkler of claim 11, wherein the riser seat decelerates the riser as the riser is transitioned from an extended position to a retracted position.

15. An irrigation sprinkler comprising:
an outer case with a longitudinal axis and a first opening at a first end;
a pressure regulator attached to the first end and contained at least partially within the outer case;
a regulator inlet connected to the pressure regulator that can be coupled to a water supply to allow a flow of water into the irrigation sprinkler, the regulator inlet comprising an annular inlet wall having a length parallel to the longitudinal axis of the outer case, the annular inlet wall comprising threads extending along a majority of the length of the annular inlet wall as measured parallel to the longitudinal axis of the outer case;
a riser positioned concentric with and at least partially within the outer case and extendable through a second opening at a second end of the case, the riser having:
a riser inlet end having a riser inlet;
a riser outlet end;
a nozzle turret connected to the riser outlet end; and
a nozzle in the nozzle turret; and
the pressure regulator configured to regulate pressure of water entering the regulator inlet to maintain a substantially constant pressure of water entering the outer case, the pressure regulator comprising:
a regulator housing;
a valve seat within the regulator inlet; and
a valve body positioned at least partially within the regulator housing and moveable with respect to the valve seat in response to pressure changes within the outer case;
wherein movement of the valve body toward the valve seat reduces the flow of water into the case inlet and wherein movement of the valve body away from the valve seat increases the flow of water into the case inlet, and wherein the pressure regulator comprises a spring which surrounds at least a portion of the annular inlet wall and overlaps at least a portion of the threads of the annular inlet wall in a direction parallel to the longitudinal axis of the outer case.

16. The irrigation sprinkler of claim 15, wherein the nozzle turret is rotatably connected to the riser outlet end.

17. The irrigation sprinkler of claim 15, wherein the riser further has a turbine mounted in the riser and rotatable by water entering the riser inlet and a gear train reduction mounted in the riser and operably coupled with the turbine and with the outlet housing.

18. The irrigation sprinkler of claim 15, wherein the pressure regulator comprises a riser seat.

19. The irrigation sprinkler of claim 18, wherein the riser seat is fixedly connected to the outer case.

20. The irrigation sprinkler of claim 18, wherein the riser seat is moveable with respect to the outer case.

21. The irrigation sprinkler of claim 18, wherein the riser seat decelerates the riser as the riser is transitioned from an extended position to a retracted position.

22. An irrigation sprinkler comprising:
an outer case having a case volume and having a first open end and a second open end, the outer case having a longitudinal axis passing through the first and second open ends;
a pressure regulator located at least partially within the case volume and at least partially between the first open end and the second open end of the outer case, the pressure regulator comprising a valve body configured to translate between a first position and a second position in response to pressure changes within the outer casing;
a biasing member configured to bias the valve body to the first position;
a threaded regulator inlet connected to the pressure regulator that can be coupled to a water supply, the threaded regulator inlet having an upstream end and a downstream end;
a riser positioned at least partially within the case volume and having:
a riser inlet end having a riser inlet; and
a nozzle positioned downstream of the riser inlet configured to distribute water over an irrigated area;
wherein the pressure regulator is configured to regulate fluid pressure within the irrigation sprinkler as water enters the outer case to maintain a substantially constant pressure in the case and the riser inlet when a higher water pressure is applied to the regulator inlet, and wherein the biasing member surrounds at least a portion of the threaded regulator inlet and overlaps at least a portion of the threaded regulator inlet in a direction parallel to the longitudinal axis of the outer case.

* * * * *